United States Patent [19]

Nino

[11] Patent Number: 5,008,781

[45] Date of Patent: Apr. 16, 1991

[54] HEADLAMP UNIT

[75] Inventor: Naohi Nino, Shizuoka, Japan

[73] Assignee: Koito Manufacturing Co., Ltd., Shizuoka, Japan

[21] Appl. No.: 433,308

[22] Filed: Nov. 8, 1989

[30] Foreign Application Priority Data

Nov. 8, 1988 [JP] Japan ................................ 63-281607

[51] Int. Cl.[5] ................................................ B60Q 1/00

[52] U.S. Cl. ....................................... 362/61; 362/346; 362/215; 362/309; 362/347

[58] Field of Search .................... 362/61, 80, 346, 347, 362/348, 297, 309, 341, 298, 211, 215

[56] References Cited

U.S. PATENT DOCUMENTS

| | | | |
|---|---|---|---|
| 1,471,767 | 10/1923 | Wood | 362/61 |
| 1,691,131 | 11/1928 | Ryder | 362/348 |
| 4,208,704 | 6/1980 | Draper | 362/346 |
| 4,238,817 | 12/1980 | Fratty | 362/309 |
| 4,612,608 | 9/1986 | Peitz | 362/346 |
| 4,704,661 | 11/1987 | Kosmatka | 362/61 |
| 4,755,919 | 7/1988 | Lindae et al. | 362/346 |
| 4,772,988 | 9/1988 | Brun | 362/346 |
| 4,803,601 | 2/1989 | Collot et al. | 362/80 |
| 4,841,423 | 6/1989 | Luciani | 362/297 |
| 4,885,669 | 12/1989 | Nino | 362/346 |
| 4,916,585 | 4/1990 | Nino | 362/61 |
| 4,918,580 | 4/1990 | Nino | 362/346 |
| 4,924,359 | 5/1990 | Lindae et al. | 362/346 |
| 4,928,214 | 5/1990 | Oyama | 362/346 |
| 4,953,063 | 8/1990 | Nino | 362/346 |

*Primary Examiner*—Stephen F. Husar
*Assistant Examiner*—D. M. Cox
*Attorney, Agent, or Firm*—Sughrue, Mion, Zinn, Macpeak & Seas

[57] ABSTRACT

Disclosued herein is a headlamp unit. The unit comprises a multi-surface concave reflector having a beam axis along which a light beam projects forward to produce a beam pattern, the reflector including upper and lower concave light reflecting parts which are respectively located at upper and lower positions with respect to a given portion of the reflector, and left and right concave light reflecting parts which are respectively located at left and right positions with respect to the given portion and have respective focuses on their respective optical axes, the optical axes being inclined with respect to the beam axis, each of the left and right concave light reflecting parts having respective curves of second degree when cut by vertical and horizontal planes; and first and second filaments of an electric bulb which are located on the beam axis. The optical axes of the left and right concave light reflecting parts are inclined toward the left and right concave light reflecting parts with respect to the beam axis, respectively, and the focuses of the left and right concave light reflecting parts are located at generally right and left positions with respect to the first filament, respectively.

13 Claims, 24 Drawing Sheets

HEADLAMP UNIT

BACKGROUND OF THE INVENTION

1. Field of the Invention

The present invention relates in general to automotive headlamps of a type having therein a concave light reflector and more particularly to a concave light reflector for the headlamps, which has an improved light reflecting surface suitable for making the headlamp project superior high and low beam patterns.

2. Description of the Prior Art

Hitherto, various types of light reflectors have been proposed and put into practical use particularly in the field of automotive headlamps. Some of them are of a concave type having a light reflecting surface which constitutes a paraboloid of revolution. When such light reflector is practically used in an automotive headlamp, an electric lamp for producing a high beam is located at a focus of the reflector and another electric lamp for producing a low beam is located in front of the focus. Furthermore, a lower half of the lamp for the low beam is concealed from the reflector, and tips of the two electric lamps are coated with light shielding material.

However, due to the inherent construction of the light reflector used therein, the conventional headlamp of such type has the following drawbacks.

In a case wherein the reflector is of a single surface parabolic type (see FIGS. 24 to 26)

As is seen from FIG. 24, when the reflector is constructed of a single reflecting surface of paraboloid of revolution, the effective area of the reflecting surface is directly dependent on the bore diameter of the reflector. That is, when the bore diameter is reduced from for example 100 mm to for example 80 mm, the effective light reflecting area "a" of the reflector is reduced by a degree corresponding to the zone denoted by reference "b". This means a reduction in the number of light beams actually reflected by the reflector.

In order to solve this drawback, a reflector having a larger solid angle may be used. That is, as is understood from FIG. 25, the solid angle is increased by replacing the reflecting surface "a" of a greater focal length (about 25 to 35 mm) by a reflecting surface "a" of a smaller focal length (10 to 20 mm). However, increasing the solid angle of the concave reflector tends to cause not only ill-matching of positioning between the high and low beam patterns projected by the headlamp but also too large patterns of the beams. In fact, in this case, a highly illuminated zone can not be provided in the beam patterns.

This will be understood from FIG. 26A in which smaller and larger high beam patterns "c" and "c" are illustrated, the smaller pattern "c" being produced by the reflector "a" and the larger pattern "c" being produced by the other reflector "a". That is, in case of the reflector "a" having the larger solid angle, the light flux density in the projected beam pattern is remarkably reduced as compared with that of the reflector "a", and thus the highly illuminated zone is not provided from the reflector "a".

A similar phenomenon, takes place also in producing the low beam pattern. That is, as is seen from FIG. 26B, the smaller beam pattern "d" is produced by the reflector "a" and the larger beam pattern "d" is produced by the reflector "a". In this low beam pattern case, beside the less density of the light flux, the reflector "a" is compelled to have a dead zone in the central portion of the beam pattern "d".

It is to be noted that, in the drawings showing the beam patterns "c", "c", "d" and "d", the lines H—H and V—V are respectively horizontal and vertical lines which extend normal to the axis of each projected beam from the headlamp.

In a case wherein the reflector is of a multi-surface parabolic reflector (see FIGS. 27 to 29)

In view of the drawbacks possessed by the above-mentioned single surface parabolic reflector, a so-called "multi-surface parabolic reflector" "e" has been proposed.

The multi-surface parabolic reflector "e" comprises, for example, four light reflecting parts which are upper, lower, left and right reflecting surfaces "f", "g", "h" and "i". The focuses "Fh" and "Fi" of the left and right reflecting surfaces "h" and "i" are positioned between the low beam producing filament "j" and the high beam producing filament "k" and near the filament "j". The focus "Fg" of the lower reflecting surface "g" is positioned at a front end portion of the high beam producing filament "k", and the focus "Ff" of the upper reflecting surface "f" is positioned between the focus "Fh" or "Fi" and the focus "Fg". Furthermore, the focal length "FDf", "FDg", "FDh" and "FDi" of the reflecting surfaces "f", "g", "h" and "i" are decided to satisfy the equation which is $$FDh = FDi \leqq FDf \approx FDg. \quad (1)$$

Designated by reference "l" is a shading member which shades a lower half of the low beam producing filament "j" from the reflector "e".

FIGS. 29A and 29B show beam patterns which are produced by the reflected light beams from the multi-surface parabolic reflector "e".

That is, FIG. 29A shows the beam pattern provided by the light produced by the high beam producing filament "k", in which the portion denoted by reference "m" is produced by the reflected light beam from the upper reflecting surface "f", the portion "n" is produced by the reflected light beam from the lower reflecting surface "g", the portion "o" is produced by the reflected light beam from the right reflecting surface "i" and the portion "p" is produced by the reflected light beam from the left light reflecting surface "h".

FIG. 29B shows the beam pattern provided by the light produced by the low beam producing filament "j", in which the portion denoted by reference "q" is produced by the reflected light beam from the upper reflecting surface "f", the portion "r" is produced by the reflected light beam from the left light reflecting surface "h" and the portion "s" is produced by the reflected light beam from the right light reflecting surface "i".

As will be understood from the light beam patterns illustrated in the drawings, the multi-surface parabolic reflector "e" can produce, with an aid of a suitable projector lens, a satisfied high beam pattern as shown in FIG. 29A. However, as is seen from FIG. 29B, the reflector "e" fails to produce a satisfied low beam pattern. In fact, the low beam pattern is compelled to have a blank at a central upper part of the pattern even when the beam from the reflector "e" is compensated by a lens. In other words, the low beam pattern provided by the reflector "e" fails to have a large highly illuminated zone.

SUMMARY OF THE INVENTION

It is therefore an object of the present invention to provide a headlamp of a type having therein a multi-surface concave reflector, which is free of the drawbacks possessed by the above-mentioned multi-surface parabolic reflector "e".

According to the present invention, there is provided a headlamp, which comprises a multi-surface concave reflector having a beam axis along which a light beam projects forward to produce a beam pattern, the reflector including upper and lower concave light reflecting parts which are respectively located at upper and lower positions with respect to a given portion of the reflector, and left and right concave light reflecting parts which are respectively located at left and right positions with respect to the given portion and have respective focuses on their respective optical axes, the optical axes being inclined with respect to the beam axis, each of the left and right reflecting parts having respective curves of second degree when cut by vertical and horizontal planes; and first and second filaments of an electric bulb which are located on the beam axis at a position forward of the focuses of the left and right concave light reflecting parts, wherein the optical axes of the left and right concave light reflecting parts are inclined toward the left and right light reflecting parts respectively with respect to the beam axis, and wherein the focuses of the left and right concave light reflecting surfaces are located at generally right and left positions with respect to the first filament, respectively.

BRIEF DESCRIPTION OF THE DRAWINGS

Other objects and advantages of the present invention will become apparent from the following description when taken in conjunction with the accompanying drawings, in which:

FIGS. 1 to 5 are drawings showing a basic construction and function of a headlamp unit of the present invention, in which:

FIG. 1 is a front view of a multi-surface reflector installed in the headlamp unit;

FIG. 2 is a horizontally sectional view of the reflector;

FIGS. 3 4A, 4B and 4C are drawings showing the correspondence between the position of a light source relative to a light reflecting surface and a beam pattern produced by a reflected light beam from the light reflecting surface; and FIG. 5 is a drawing showing the correspondence between the inclination angle of the optical axis of the reflecting surface relative to the light beam axis and the location of the beam pattern produced by the reflected light beam from the reflecting surface;

FIGS. 6 to 8 are drawings showing the correspondence between the position of light sources in a headlamp unit and the beam pattern produced by the headlamp unit, in which:

FIG. 6 is a horizontally sectional view of the headlamp unit;

FIG. 7 is a vertically sectional view of the headlamp unit;

FIGS. 8A, 8B and 8C are drawings showing beam patterns produced by the headlamp unit;

FIGS. 9 and 17 are drawings showing various embodiments of the present invention, in which:

FIG. 9 is a front view of a unit consisting of a reflector and a filament, which unit is employed in each embodiment;

FIGS. 11 and 12 are drawings showing a first embodiment, in which:

FIG. 11 is a perspective view of a reflector employed in the first embodiment;

FIGS. 13 and 14 are drawings showing a second embodiment, in which:

FIG. 13 is a perspective view of a reflector employed in the second embodiment;

FIGS. 18 to 20 are drawings showing a multi-surface concave reflector which is employable in the invention, in which:

FIG. 18 is a front view of the reflector;

FIG. 19 is a sectional view taken along the line A—A of FIG. 18; and

FIGS. 21 and 22 are drawings showing a modification of the multi-surface concave reflector of FIGS. 18 to 20, in which:

FIG. 21 is a front view of the modification; and

FIGS. 27 to 29 are drawings showing another headlamp unit which is provided by modifying the headlamp unit of FIGS. 24 and 25, in which:

FIG. 27 is a front view of the headlamp unit;

FIG. 28 is a horizontally sectional view of the headlamp unit; and

DETAILED DESCRIPTION OF THE INVENTION

In order to clarify the invention, the description will be commenced with respect to a basic structure of a headlamp according to the present invention with an aid of FIGS. 1 to 5 of the accompanying drawings.

Figure 1:
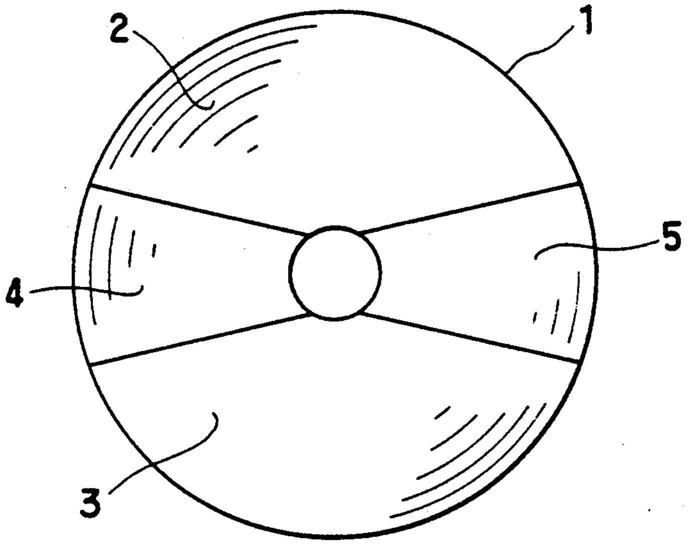
Figure 2:
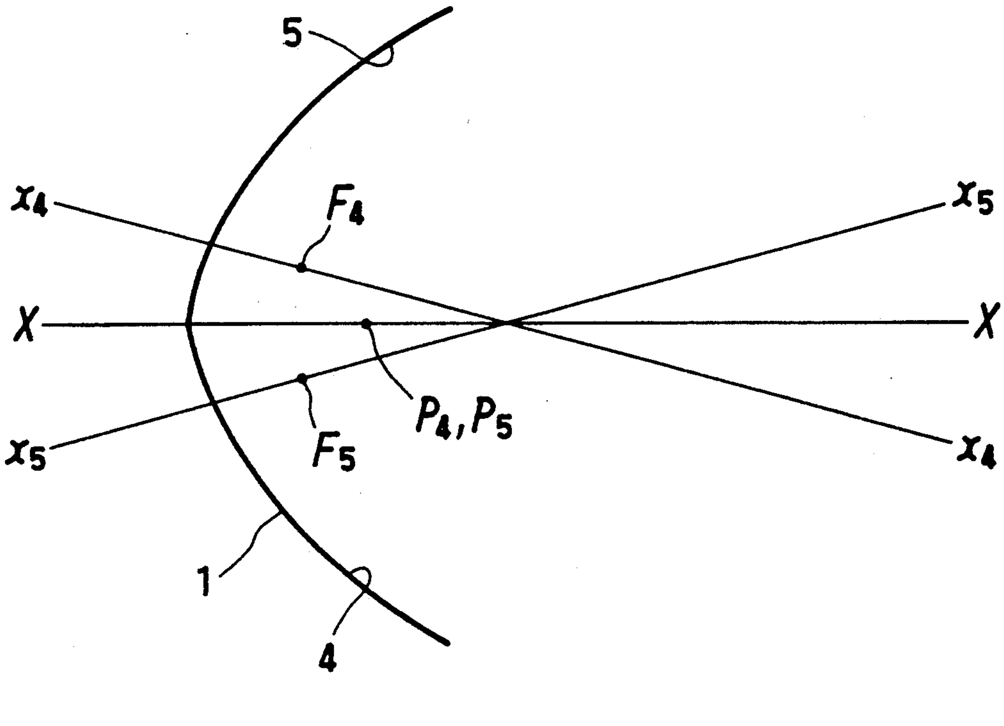

Referring to FIGS. 1 and 2, there is shown a reflector 1 of a parabolic type which is to be installed in a headlamp of the present invention. The reflector 1 has a circular opening therein and comprises four light reflecting surface, which are upper, lower, left and right reflecting surfaces 2, 3, 4 and 5.

Denoted by X—X in FIG. 2 is a beam axis of the reflector 1, which extends straightly and horizontally in a forward direction.

Each of the left and right reflecting surfaces 4 and 5 is shaped to have curves of second degree (or curves of the second order) when cut by vertical and horizontal planes. Denoted by $F_4$ and $F_5$ (see FIG. 2) are focuses of the reflecting surfaces 4 and 5 respectively.

Denoted by references $P_4$ and $P_5$ are points on which light sources are to be positioned. As shown, these points $P_4$ and $P_5$ are located at the same position which is remote from the focues $F_4$ and $F_5$.

As will be understood from FIG. 2, the light source locating point $P_4$ for the left reflecting surface 4 is located at a front and left position with respect to the focus $F_4$ and the light source locating point $P_5$ for the right reflecting surface 5 is located at a front and right position with respect to the focus $F_5$. The light source locating points $P_4$ and $P_5$ are located on the beam axis X—X. The optical axis $X_4$—$X_4$ of the left reflecting surface 4 is inclined leftward relative to the beam axis X—X, and the optical axis $X_5$—$X_5$ of the right reflecting surface 5 is inclined rightward relative to the beam axis X—X.

The upper and lower reflecting surfaces 2 and 3 may be of any type of reflector.

Prior to explaning the operation of the reflector 1, a beam pattern produced by a reflected light from a light reflector of a paraboloid of revolution will be described with reference to FIGS. 3 and 4.

Figure 3:
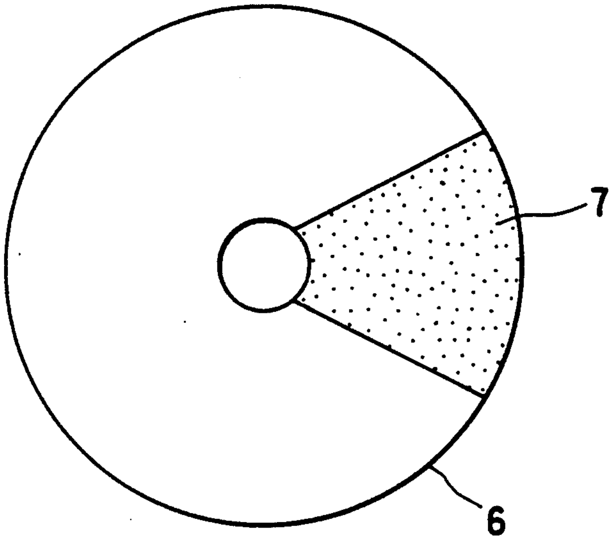

It is to be noted that the reflected light for producing the beam pattern is from the right sectoral part 7 of the light reflector 6, as shown in FIG. 3.

Figure 4A:
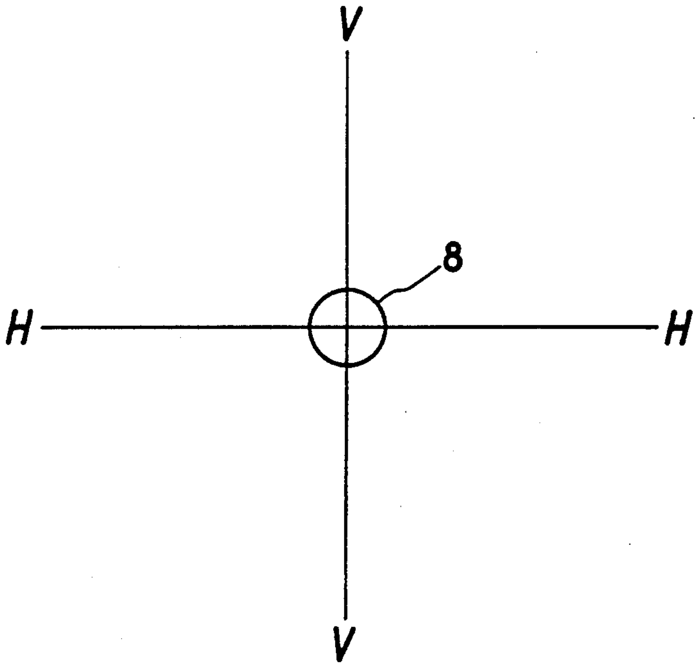

When, as will be understood from FIG. 4A, a spot light source is located at the focus of the sectoral part 7, the light from the light source is reflected by the sectoral part 7 and forms a spot-like beam pattern 8 at the intersection of horizontal and vertical lines H—H and V—V.

Figure 4B:
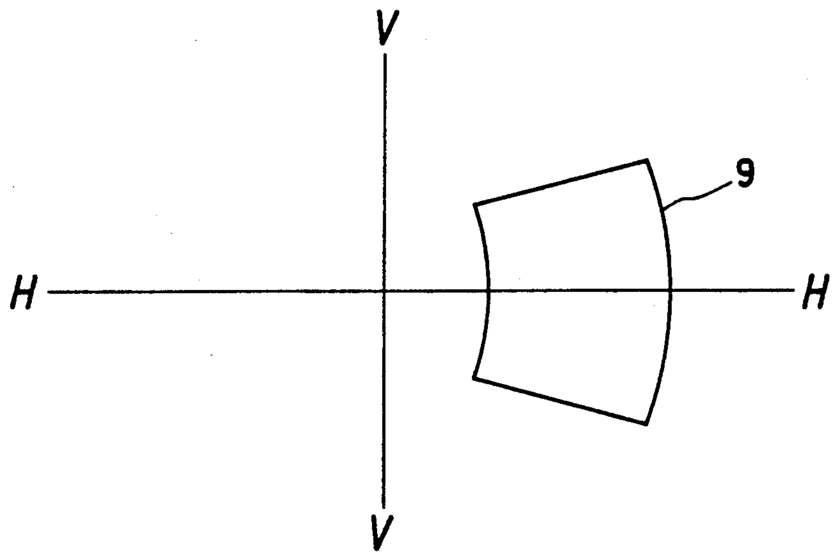

When the spot light source is moved forward, the beam pattern moves rightward showing a sectoral shape 9 with a larger right side as shown in FIG. 4B.

Figure 4C:
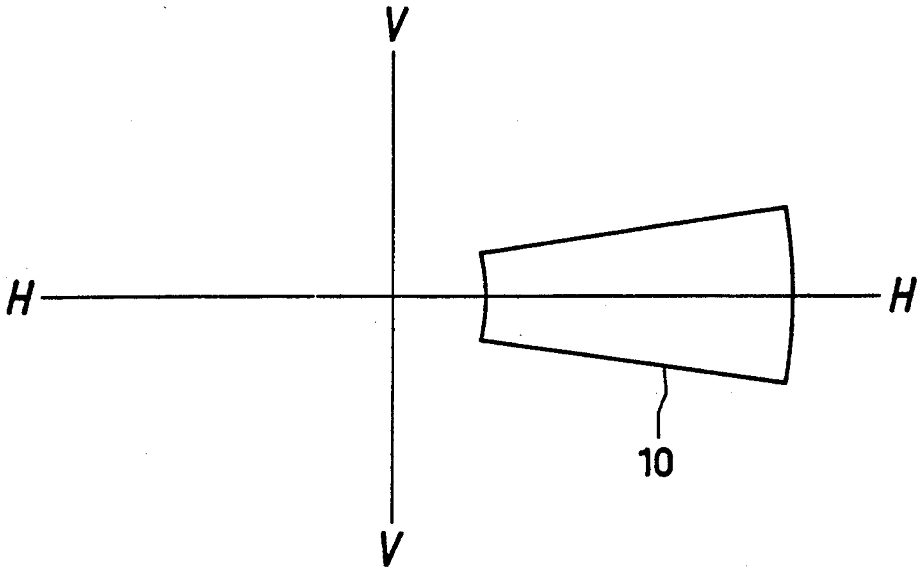

When the spot light source is moved toward the sectoral part 7, the beam pattern increases its lateral length showing a flat sectoral shape 10 as shown in FIG. 4C.

Figure 5:
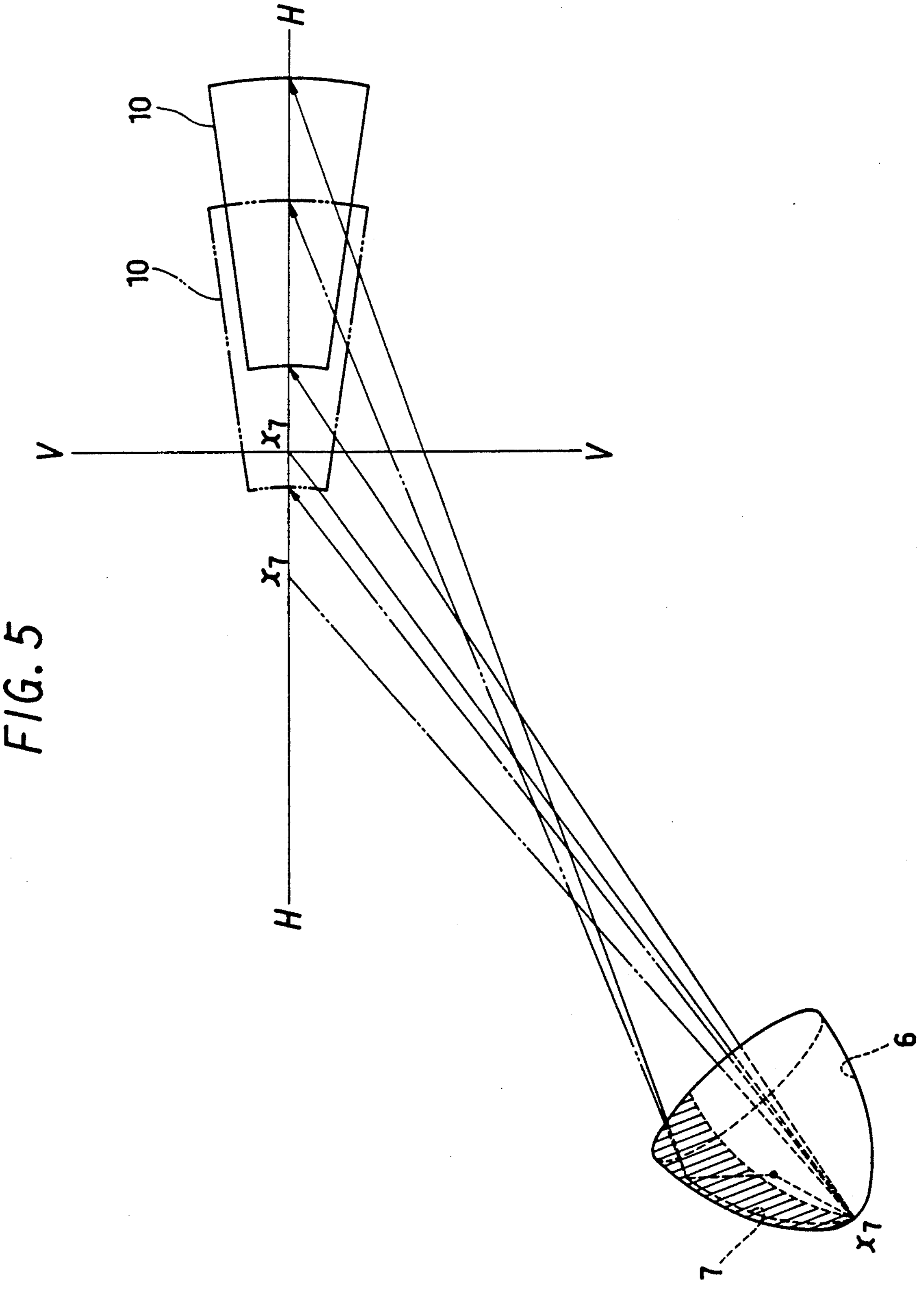

When now the optical axis $X_7$—$X_7$ of the light reflecting sectoral part 7 is inclined rightward as illustrated by phantom lines in FIG. 5, the beam pattern 10 moves leftward having its left side located near the intersection of the lines V—V and H—H.

Figure 6:
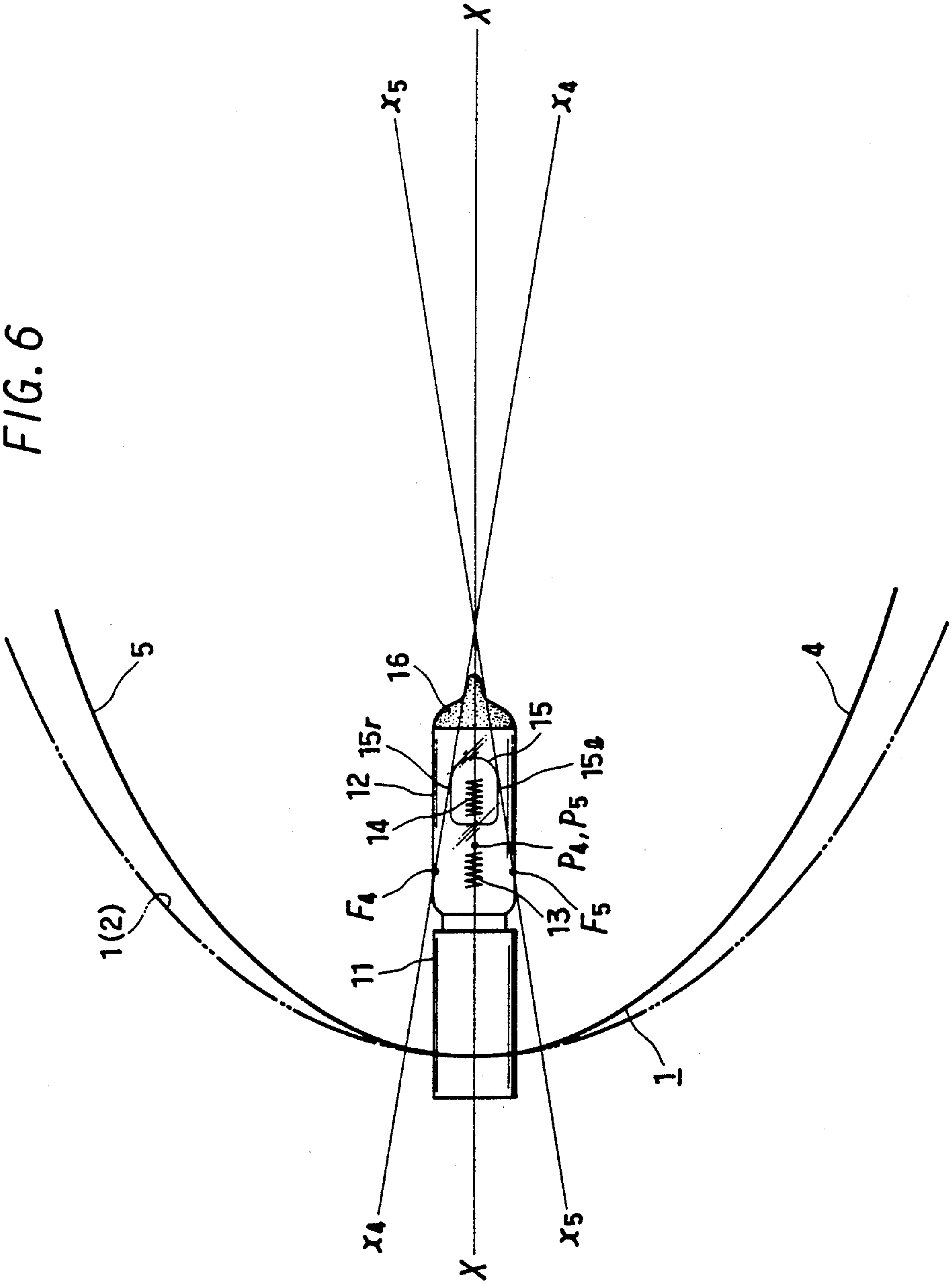
Figure 7:
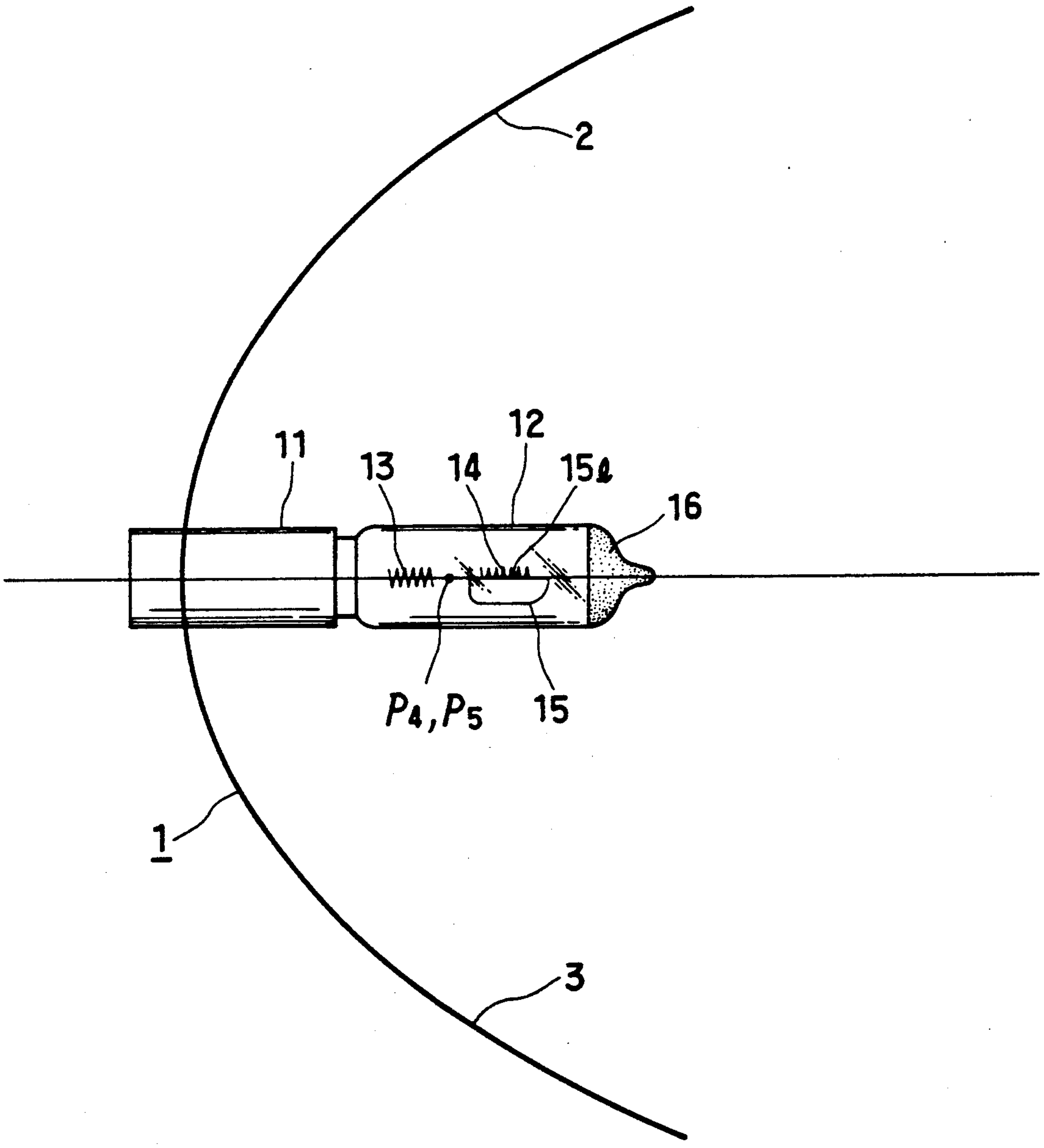

Referring to FIGS. 6 to 8, there is shown a light reflector 1 to which respective filaments for high and low beams are arranged.

Denoted by numeral 11 is an electric bulb which is, for example, of $H_4$ type. The electric bulb 11 is fixed relative to the light reflector 1.

Within a glass tube 12 of the electric bulb 11, there are coaxially arranged respective filaments 13 and 14 for high and low beams. The filament 14 is located in front of the filament 13.

Denoted by numeral 15 is a shade member installed in the glass tube 12, which covers a lower half part of the low beam producing filament 14. A left side **15*l* of the shade member 15 is positioned lower than a right side 15*r*** of the same.

Denoted by numeral 16 is a light blocking layer applied to a tip of the glass tube 12. With this layer 16, only the light reflected by the light reflector 1 is projected forward.

The two filaments 13 and 14 are so arranged that the above-mentioned light source locating points $P_4$ and $P_5$ are positioned at a generally middle portion between the filaments 13 and 14.

The upper and lower light reflecting surfaces 2 and 3 are of a parabolic reflector, whose focuses are positioned at the high beam producing filament 13.

Figure 8A:
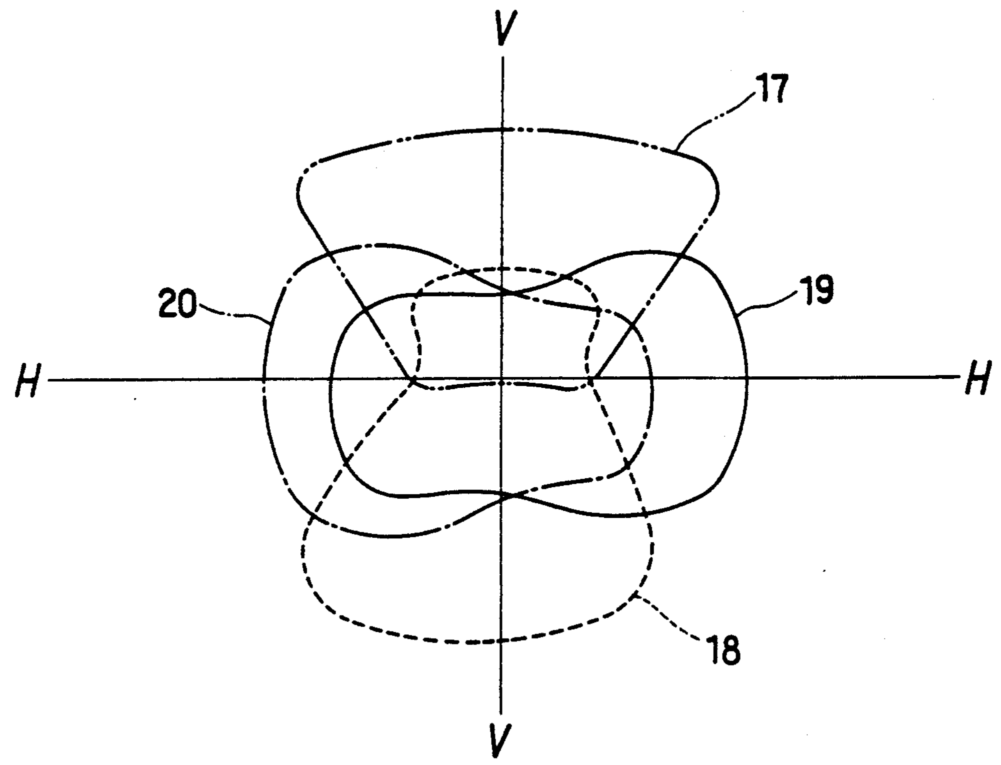

When the high beam producing filament 13 is energized, the reflector 1 produces a beam pattern as shown in FIG. 8A. In this pattern, the illuminated part denoted by numeral 17 is produced by the light reflected by the upper reflecting surface 2, the illuminated part denoted by numeral 18 is produced by the light reflected by the lower reflecting surface 3, the illuminated part denoted by numeral 19 is produced by the light reflected by the left light reflecting surface 4, and the illuminated part denoted by numeral 20 is produced by the light reflected by the right reflecting surface 5.

When the reflector 1 produces the above-mentioned beam pattern, a satisfied high beam pattern is easily produced with an aid of a suitable projector lens.

Figure 8B:
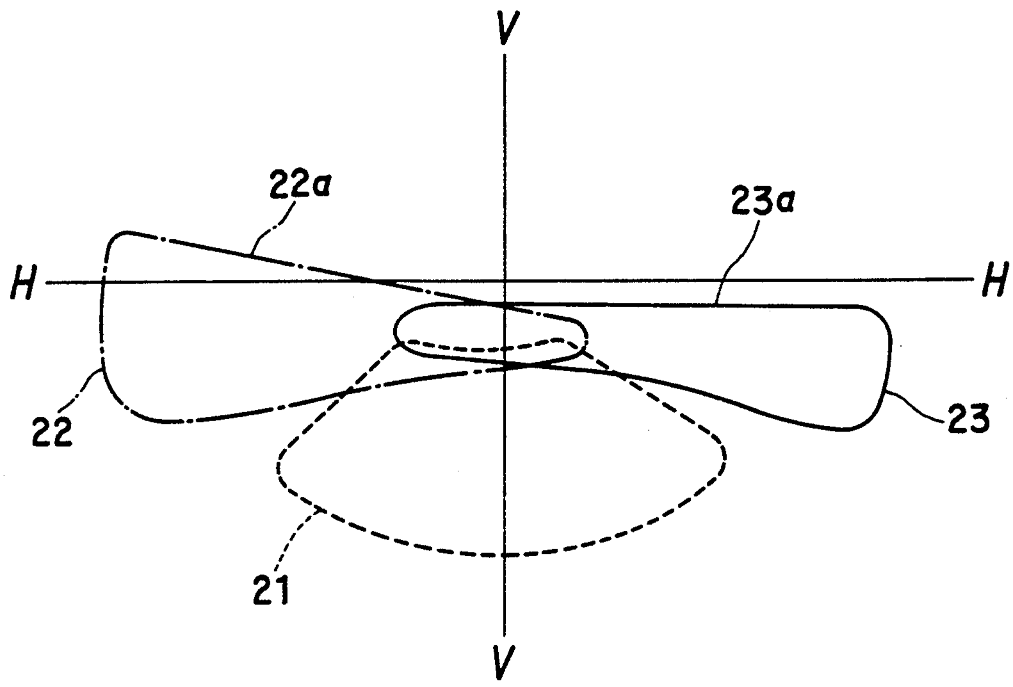

When the low beam producing filament 14 is energized, the reflector 1 produces a beam pattern as shown in FIG. 8B. In this pattern, the illuminated part denoted by numeral 21 is produced by the light reflected by the upper reflecting surface 2, the illuminated part 22 is produced by the light reflected by the left reflecting surface 4 and the illuminated part 23 is produced by the light reflected by the right reflecting surface 5. It is to be noted that, in this beam pattern, there is no illuminated part produced by a reflected light from the lower reflecting surface 3. This is because the lower half portion of the filament 14 is concealed by the shade member 15. As is seen from the beam pattern of FIG. 8B, the upper edge **22*a* of the illuminated part 22 is positioned higher than the upper edge 23*a* of the illuminated part 23. This is because the left side 15*l* of the shade member 15 is positioned lower than the right side 15*r* of the same, and thus a lower portion of the left reflecting surface 4 receives a greater amount of light from the filament 14 than that of the right reflecting surface 5**.

As is understood from the beam pattern of FIG. 8B, the illuminated parts 22 and 23 produced by the reflected light from the left and right reflecting surfaces 4 and 5 extend laterally and have their inside portions merged with each other at a central portion of the beam pattern. Thus, a highly illuminated zone having a fairly large size can be produced at a central portion of the beam pattern. Thus, a satisfied low beam pattern is produced with an aid of a suitable lens.

Referring to FIGS. 9 to 17, there are shown several reflectors which embodies the present invention.

That is, in the following, the configuration of the left and right reflecting surfaces of each reflector will be described. Furthermore, various beam patterns provided by analizing the reflectors by using a computer simulation method will be explained.

Figure 9:
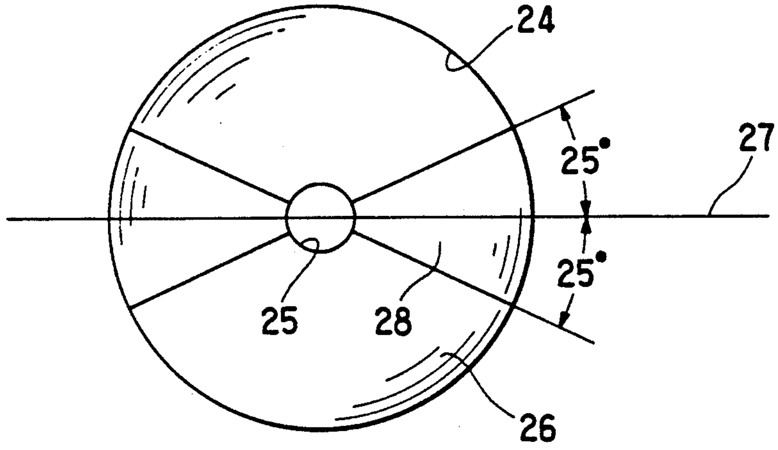
Figure 10:
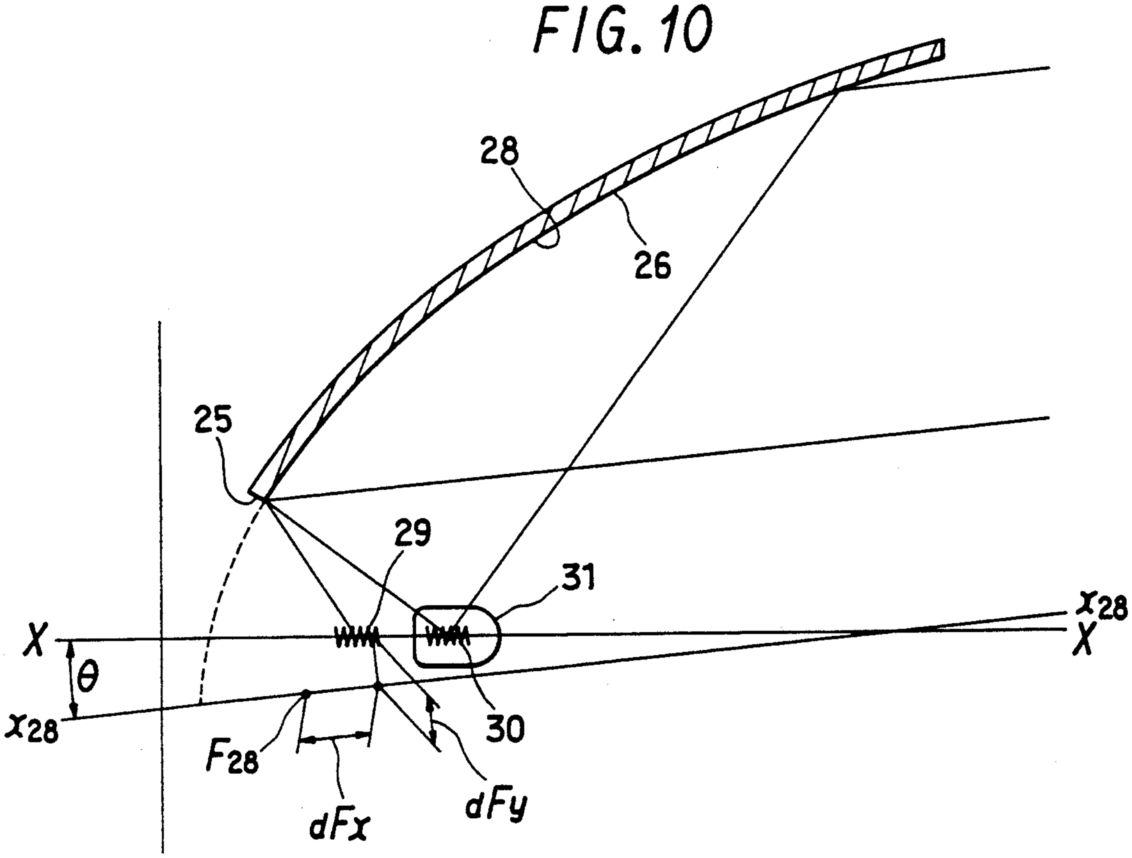
FIG. 10 is a horizontally sectional view of the unit of FIG. 9.

Referring to FIGS. 9 and 10, there is shown a first reflector which embodies the invention.

The diameter of the mouth portion 24 of the reflector is 100 mm, and the diameter of a center aperture 25 of the reflector is 26 mm. Denoted by numeral 28 is a sectoral part or right reflecting part of a reflecting surface 26, which consists of upper and lower sectoral portions each having a center angle of 25° from a horizontal line 27 which passes through the center of the reflector. The angle of the optical axis $x_{28}$—$x_{28}$ of the sectoral part 28 relative to the beam axis X—X is denoted by $\theta$.

Each filament 29 or 30 is shaped like a square pillar which is 5 mm in length and 1.5 mm in each side. The filament 29 for the high beam is arranged to extend along the beam axis X—X having its front end located at a given position. As is shown in FIG. 10, the given position is separated from the focus $F_{28}$ of the sectoral reflecting part 28 by a distance of dFx in the fore-and-aft direction and by a distance of dFy in the lateral direction (or rightward). The filament 30 for the low beam is located in front of the filament 29 by a distance of 7.0 mm and extends along the beam axis X—X.

Denoted by numeral 31 is a shade member which covers a lower half part of the filament 30. With this shade member 31, the light produced by the filament 30 is prevented from emitting toward the lower half of the sectoral part 28.

Figure 11:
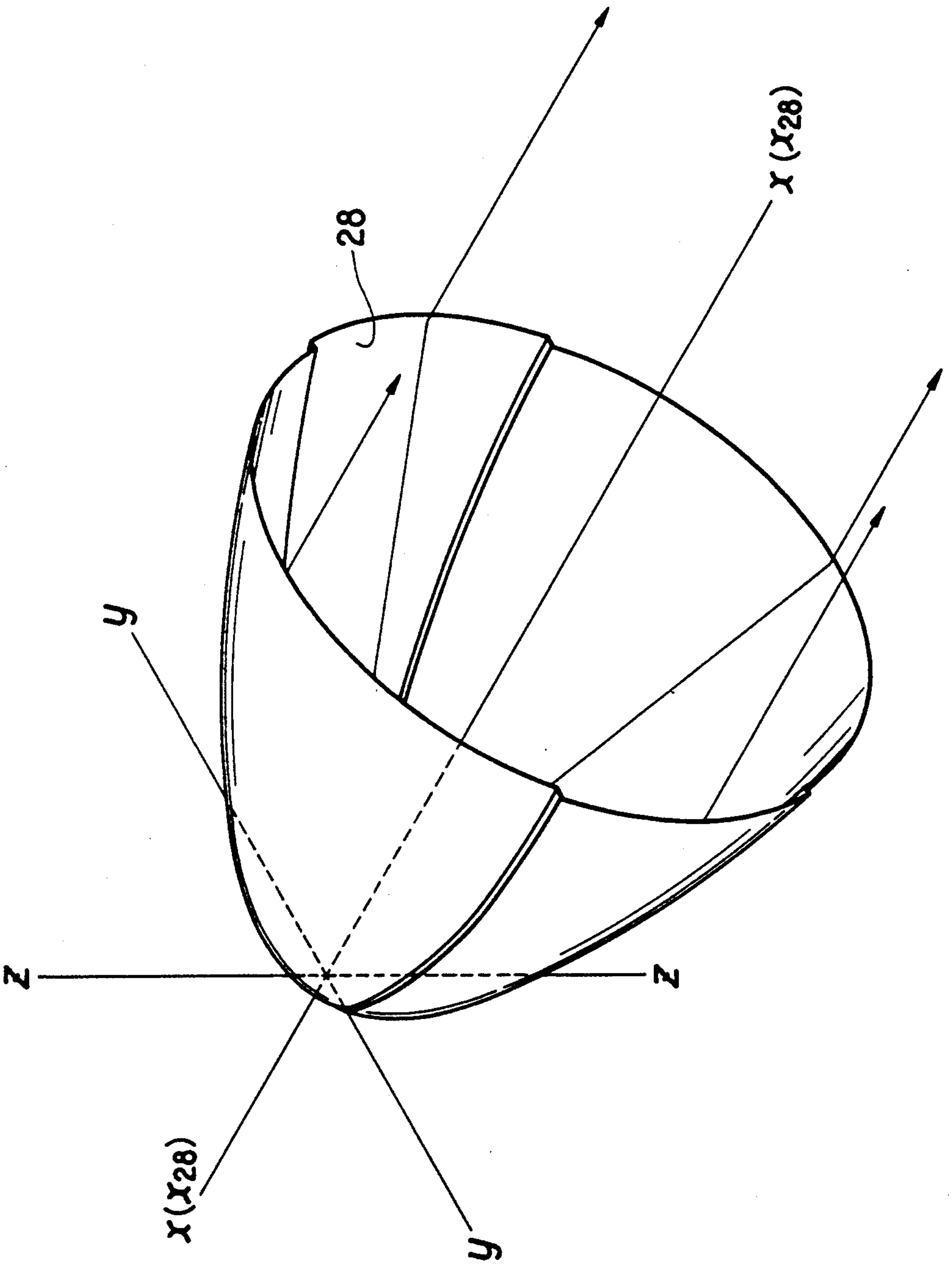

Referring to FIGS. 11 and 12, there is shown a first embodiment of the present invention.

In this embodiment, the reflecting part 28 is of a parabolic surface. This parabolic surface satisfies the equation which is:

$$y^2+z^2=4fx \tag{2}$$

wherein:

x: $x_{28}$—$x_{28}$, y: horizontal axis intersecting the axis x at right angles, z: vertical axis intersecting the axis x at right angles, f: focal distance of the parabolic surface.

Figure 12A:
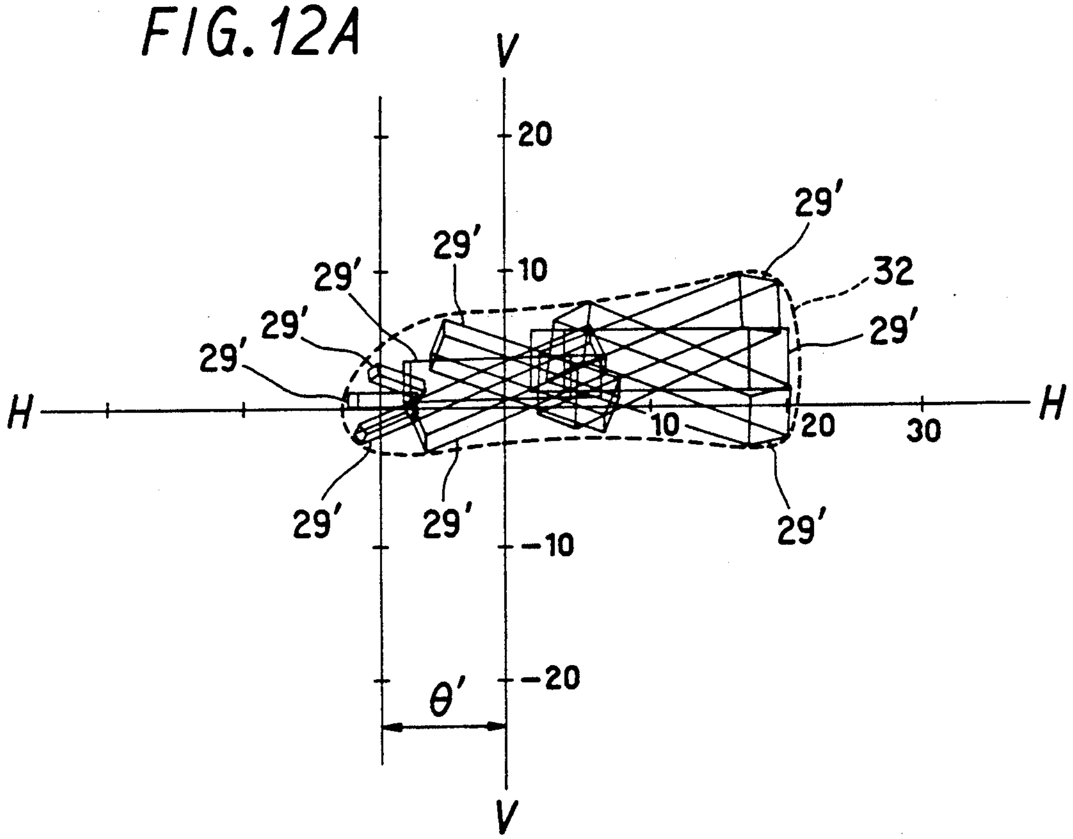
FIGS. 12A and 12B are drawings showing beam patterns provided by the first embodiment.
Figure 12B:
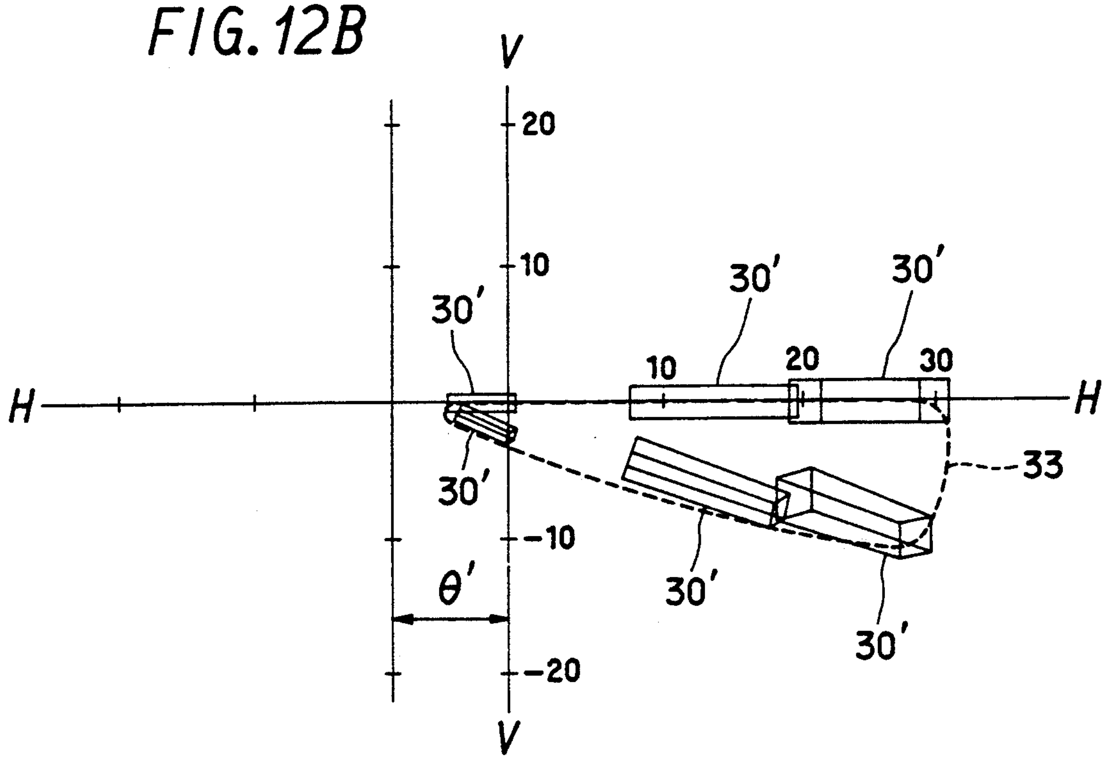

When f is 10 mm, dFx is 6 mm, dFy is 4 mm and $\theta$ is 8°, such beam patterns as shown in FIGS. 12A and 12B are provided.

It is to be noted that the beam patterns are images of the filaments 29 and 30 which are displayed on a spherical screen which is located 10 m away from the headlamp unit. The intersection of the line V—V and the line H—H is located on an extension of the light beam axis X—X. The degree of displacement of the beam axis X—X from the optical axis $x_{28}$—$x_{28}$ is represented by $\theta'$.

The graduation carried on the line V—V and the line H—H represents the angle of the reflecting surface relative to the beam axis X—X.

When the filament 29 for the high beam is energized, such a beam pattern 32 as shown in FIG. 12A is provided. Numerals 29', 29' . . . denote images of the filaments 29, 29 . . . in the beam pattern 32.

When the filament 30 for the low beam is energized, such a beam pattern 33 as shown in FIG. 12B is provided. Numerals 30', 30' . . . denote images of the filaments 30, 30 . . . in the beam pattern 33.

As is understood from the beam patterns 32 and 33, each of them has a clearly contoured central zone. In fact, the low beam pattern 33 has, near the intersection of the lines V—V and H—H, a highly illuminated area. In both high and low beam patterns 32 and 33, about 20° to 30° in beam diffusion angle is obtained.

Figure 13:
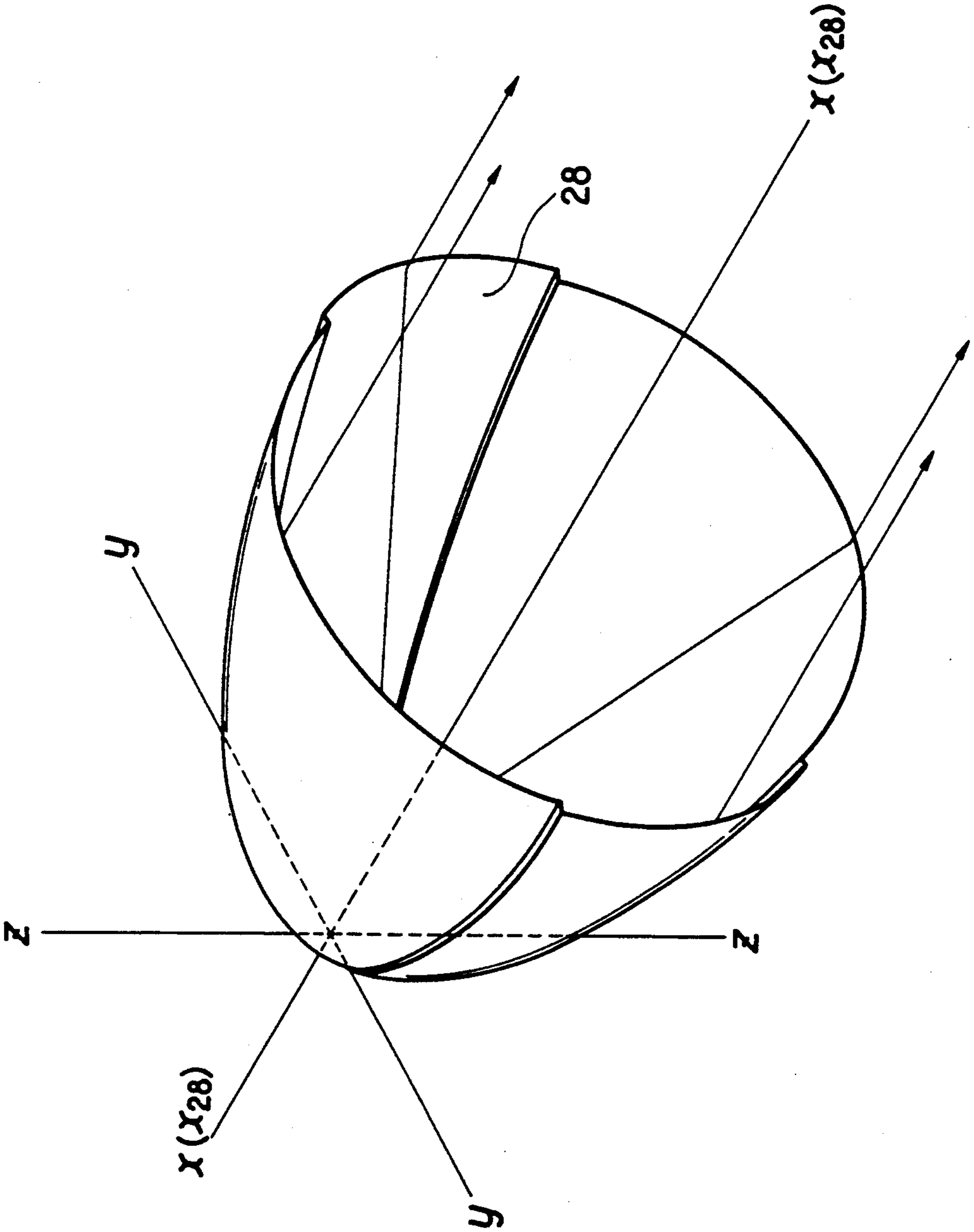

Referring to FIGS. 13 to 14, there is shown a second embodiment of the present invention.

In this embodiment, the reflecting part 28 is of an elliptic paraboloid surface. The part 28 satisfies the equation which is:

$$\frac{y^2}{4Fy}+\frac{z^2}{4Fz}=x \tag{3}$$

wherein:

x: $x_{28}$—$x_{28}$, y: horizontal axis intersecting the axis x at right angles, z: vertical axis intersecting the axis x at right angles, Fy: 10 mm, and Fz: 9 mm.

Figure 14A:
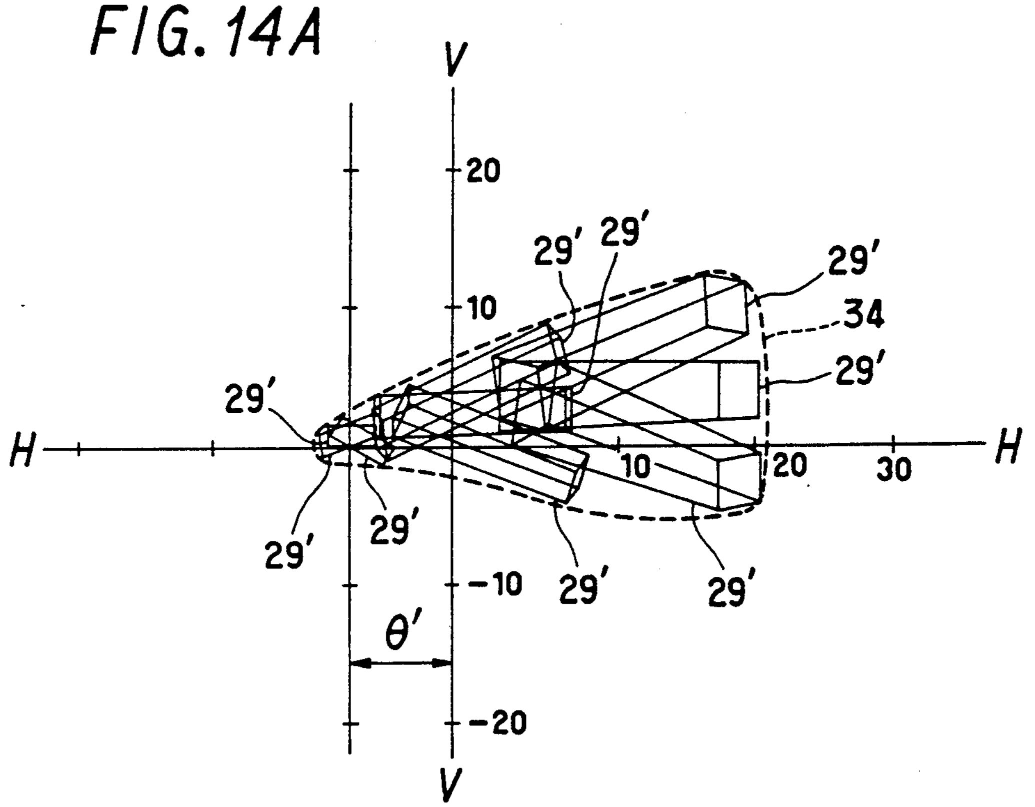
FIGS. 14A and 14B are drawings showing beam patterns provided by the second embodiment.
Figure 14B:
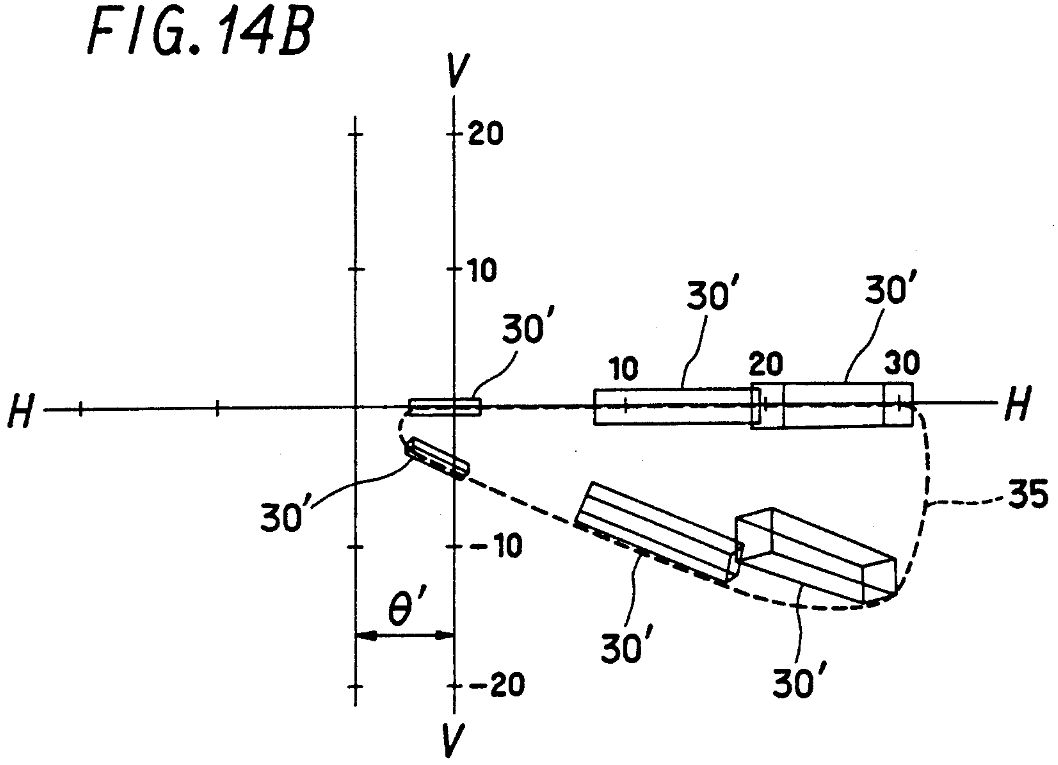

When dFx is 6 mm, dFy is 4 mm and $\theta$ is 8°, such beam patterns as shown in FIGS. 14A and 14B are provided.

That is, when the filament 29 for the high beam is energized, such a beam pattern 34 as shown in FIG. 14A is provided. While, when the filament 30 for the low beam is energized, such a beam pattern 35 as shown in FIG. 14B is provided.

As is seen from FIG. 14B, in the low beam pattern, the highly illuminated central zone is increased in size.

Figure 15A:
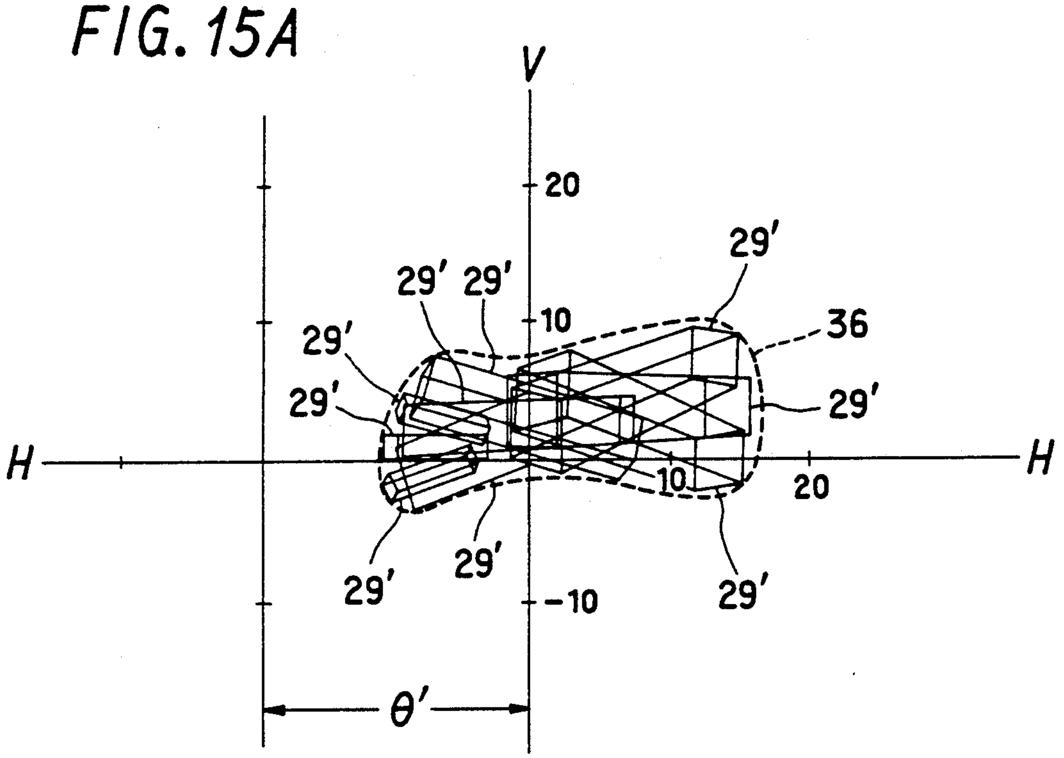
FIGS. 15A and 15B are drawings showing beam patterns provided by a third embodiment.
Figure 15B:
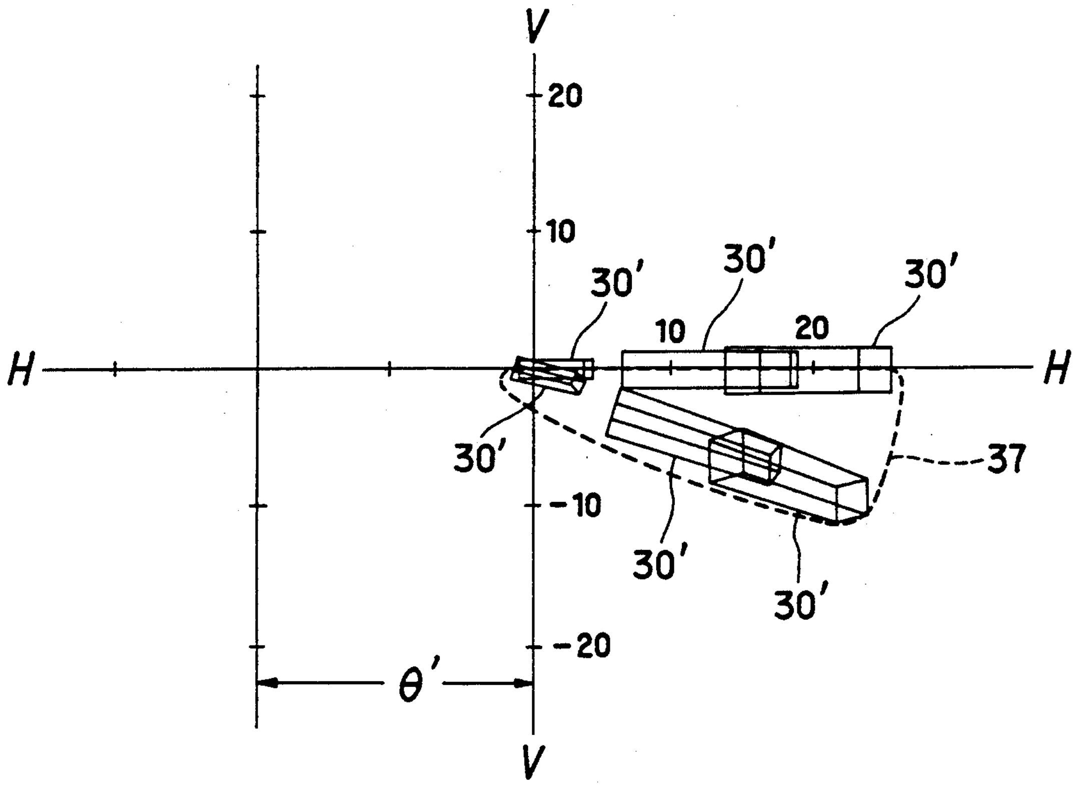

Referring to FIGS. 15A and 15B, there are shown beam patterns which are provided by a third embodiment of the present invention. The beam pattern 36 of FIG. 15A is provided when the filament 29 for the high beam is energized, while, the beam pattern 37 of FIG. 15B is provided when the filament 30 for the low beam is energized.

In this third embodiment, the reflecting part 28 is of a complex reflecting surface which consists of a parabolic surface and an elliptic surface. That is, the complex reflecting surface describes a parabola (the focal length f is 10 mm) when cut by a vertical plane and describes an ellipse (the first focal distance $f_1$ is 10 mm and the second focal distance $f_2$ is 200 mm) when cut by a horizontal plane.

In fact, the beam patterns shown in FIGS. 15A and 15B are provided when dFx is 6 mm, dFy is 4 mm and $\theta$ is 15°. These patterns are very similar to those of FIGS. 12A and 12B.

Figure 16A:
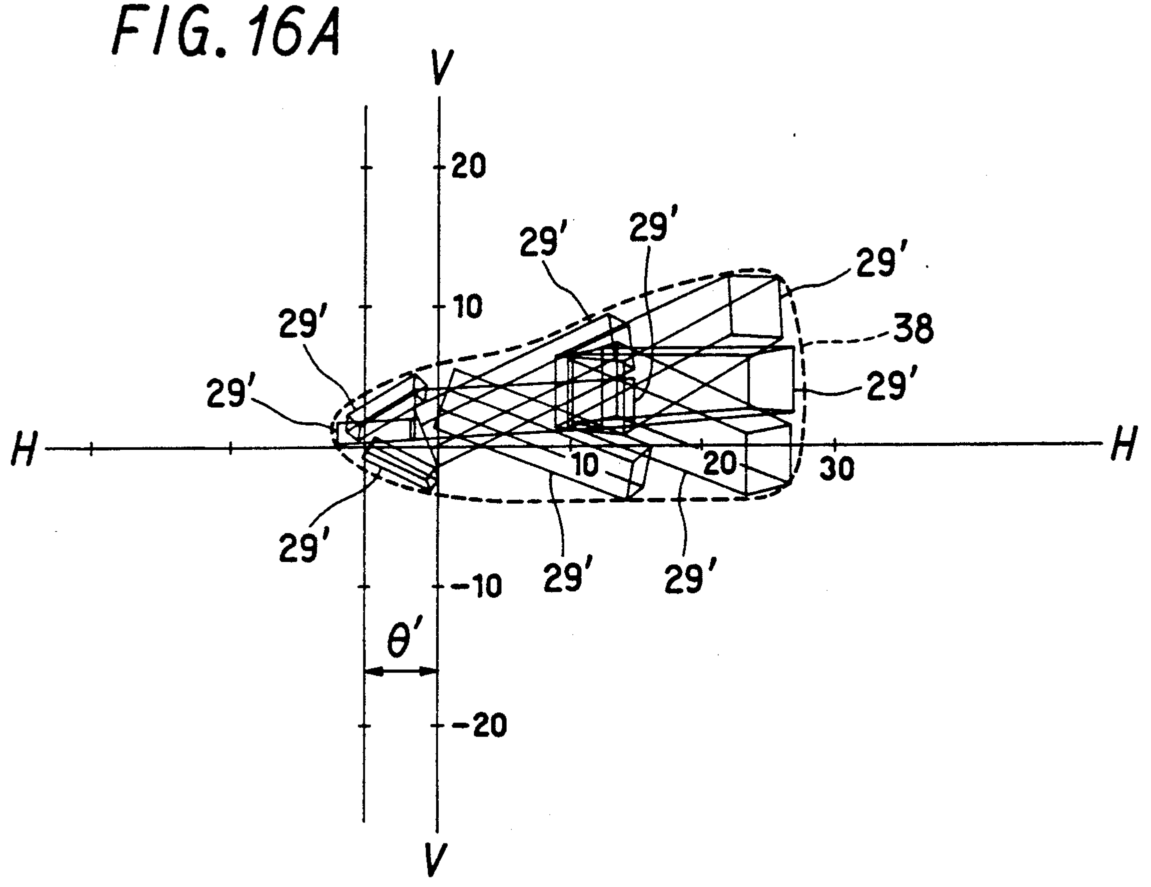
FIGS. 16A and 16B are drawings showing beam patterns provided by a fourth embodiment.
Figure 16B:
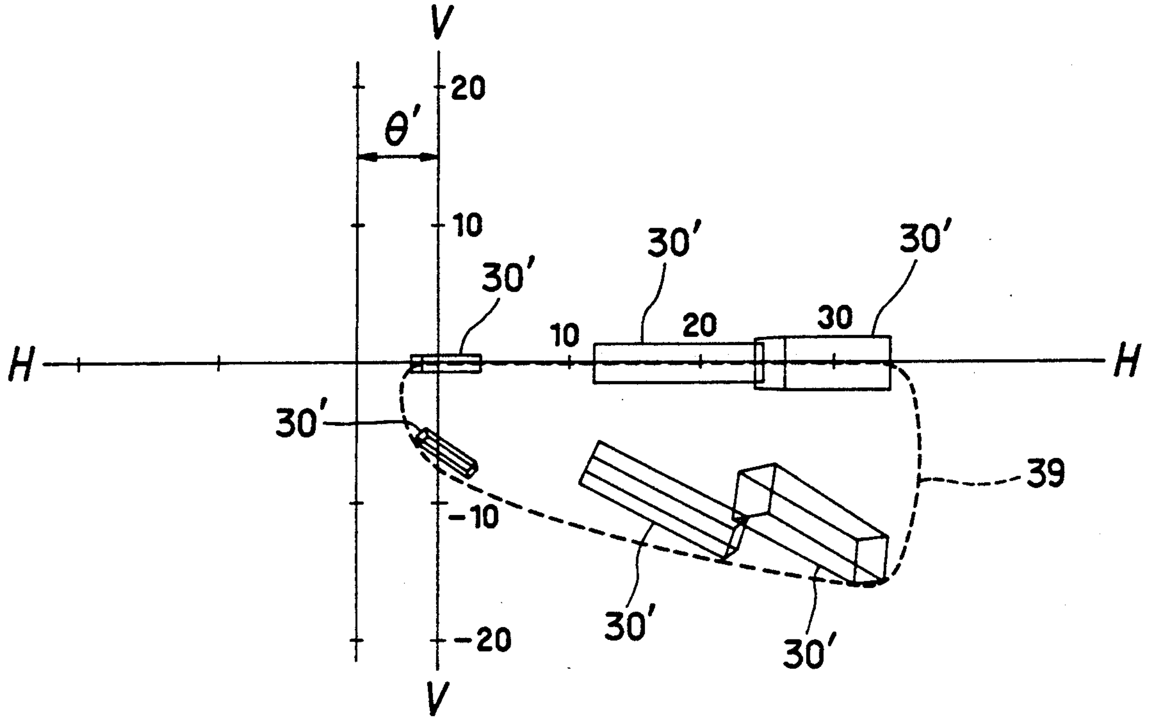

Referring to FIG. 16A and 16B, there are shown beam patterns which are provided by a fourth embodiment of the present invention. The beam pattern 38 of FIG. 16A is provided when the filament 29 for the high beam is energized, while, the beam pattern 39 of FIG. 16B is provided when the filament 30 for the low beam is energized.

In this fourth embodiment, the reflecting part 28 is of a complex reflecting surface which consists of a parabolic surface and an elliptic surface. That is, the complex reflecting surface describes an ellipse (the first focal distance $f_1$ is 10 mm and the second focal distance $f_2$ is 300 mm) when cut by a vertical plane and describes a parabola (the focal distance f is 10 mm) when cut by a horizontal plane.

In fact, the beam patterns shown in FIGS. 16A and 16B are provided when dFx is 6 mm, dFy is 4 mm and $\theta$ is 5°. These patterns are very similar to those of FIGS. 12A and 12B. In the low beam pattern 39, the lower end of the same is somewhat lowered thereby increasing the height of the same.

Figure 17A:
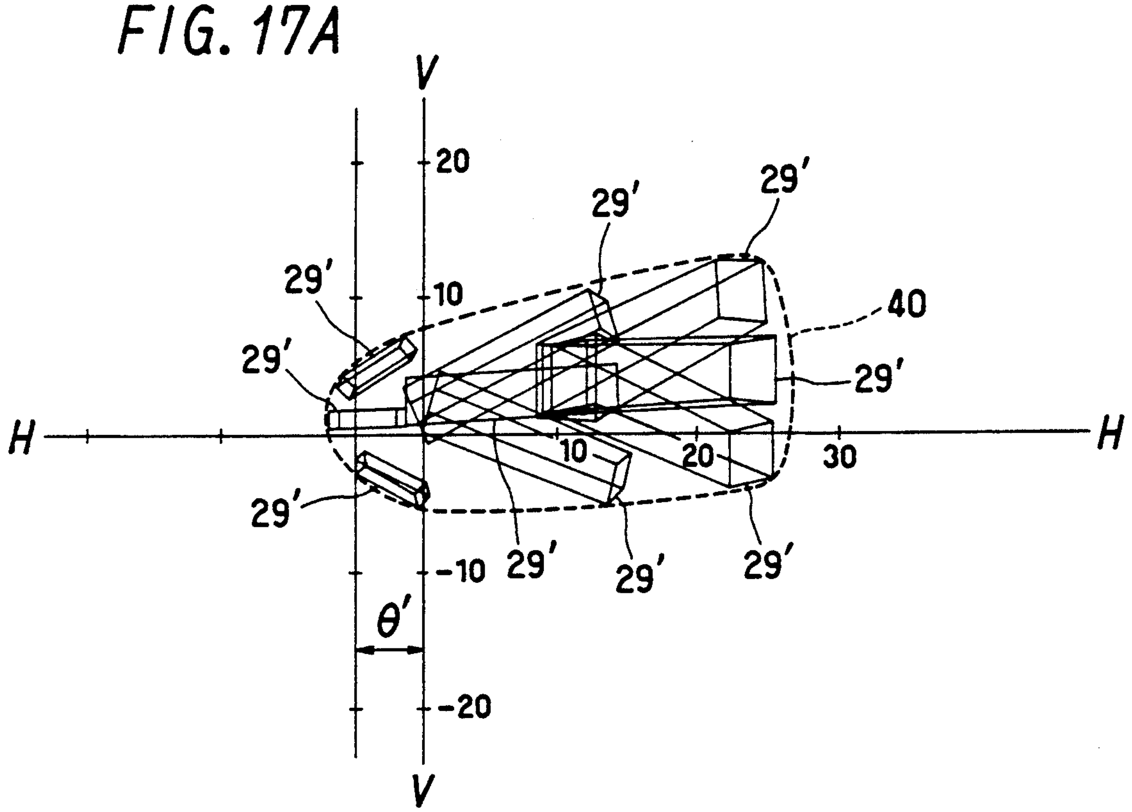
FIGS. 17A and 17B are drawings showing beam patterns provided by a fifth embodiment.
Figure 17B:
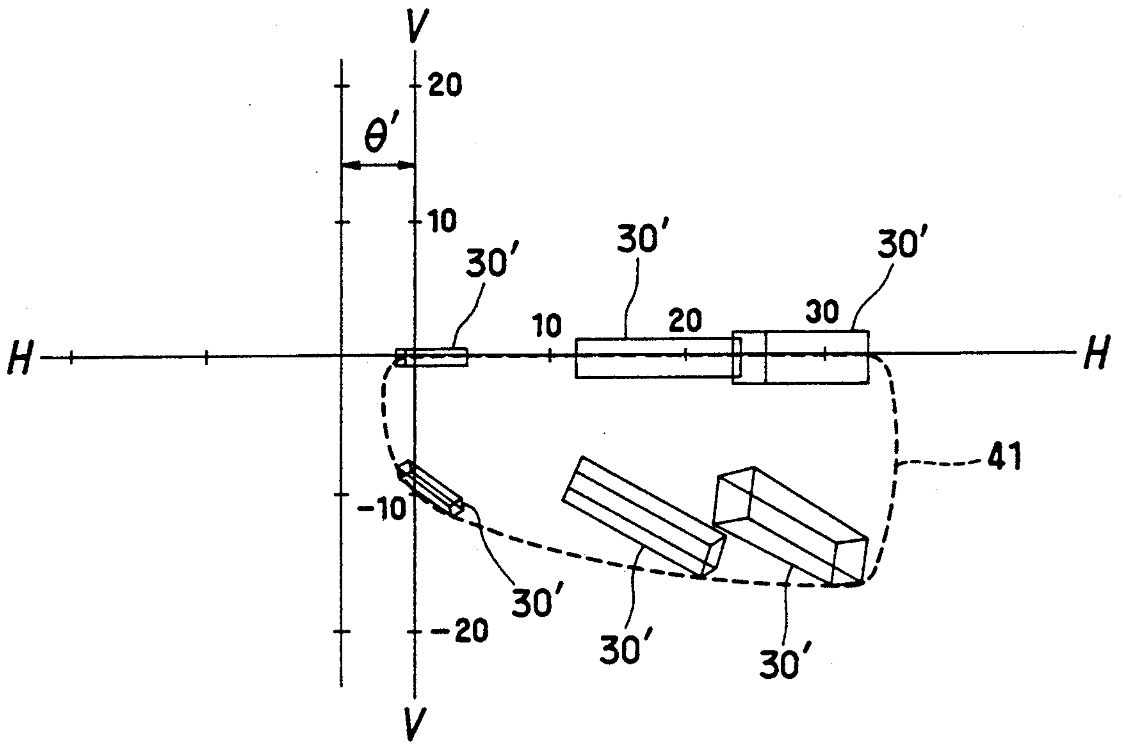

Referring to FIGS. 17A and 17B, there are shown beam patterns which are provided by a fifth embodiment of the present invention. The beam pattern 40 of FIG. 17A is provided when the filament 29 for the high beam is energized, while, the beam pattern 41 of FIG. 17B is provided when the filament 30 for the low beam is energized.

In this fifth embodiment, the reflecting part 28 is of a complex reflecting surface which consists of a parabolic surface and an elliptic surface. That is, the complex reflecting surface describes an ellipse (the first focal distance $f_1$ is 10 mm and the second focal distance $f_2$ is 200 mm) when cut by a vertical plane and describes a parabola (the focal distance f is 10 mm) when cut by a horizontal plane.

In fact, the beam patterns shown in FIGS. 17A and 17B are provided when dFx is 6 mm, dFy is 4 mm and $\theta$ is 5°. In this fifth embodiment, the lower end of the highly illuminated central zone of the low beam pattern 41 is further lowered as compared with the beam pattern of FIG. 16B.

Figure 18:
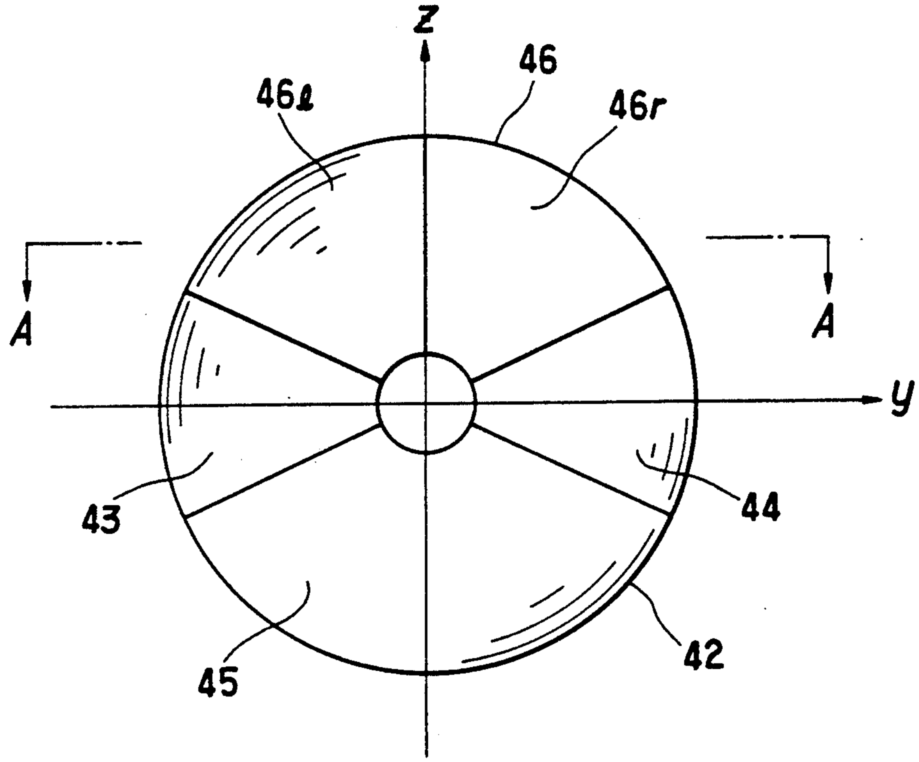
Figure 19:
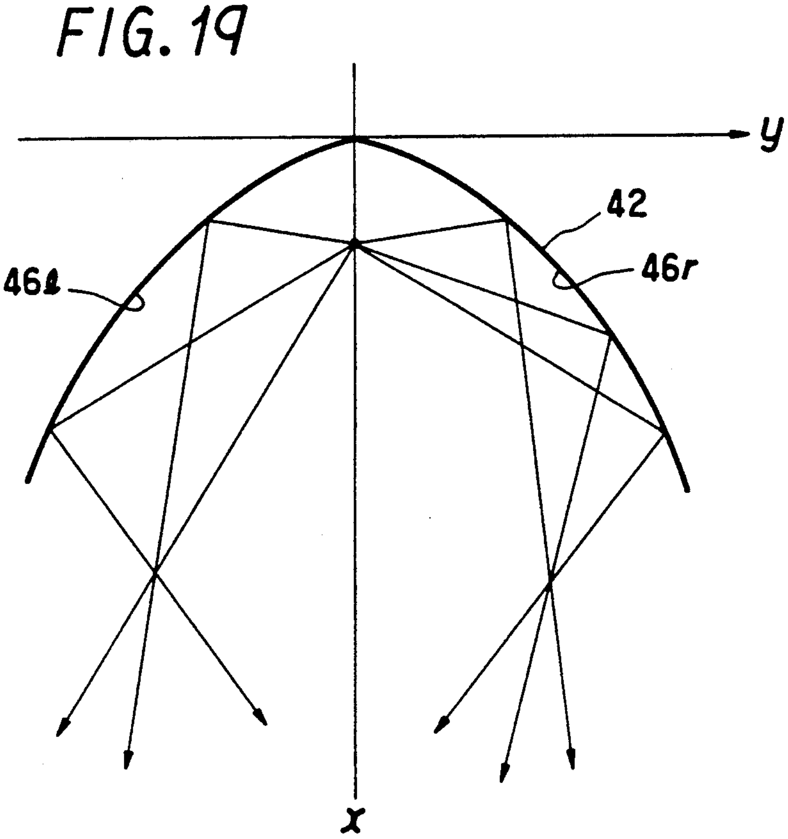

Referring to FIGS. 18 to 20, there is shown a multi-surface concave reflector 42 which is employable in the invention.

The left and right light reflecting parts 43 and 44 of the reflector 42 are of the above-mentioned light reflecting part 28.

The lower light reflecting part 45 is of a paraboloid of revolution, and the upper light reflecting part 46 is divided into left and right portions **46*l* and 46*r*. Each of the portions 46*l* and 46*r* describes a parabola when cut by a vertical plane and describes an ellipse when cut by a horizontal plane, and the optical axis xl—xl of the left portion 46*l* and the optical aixs xr—xr of the right portion 46*r*** are inclined with respect to the beam axis X—X.

Figure 20A:
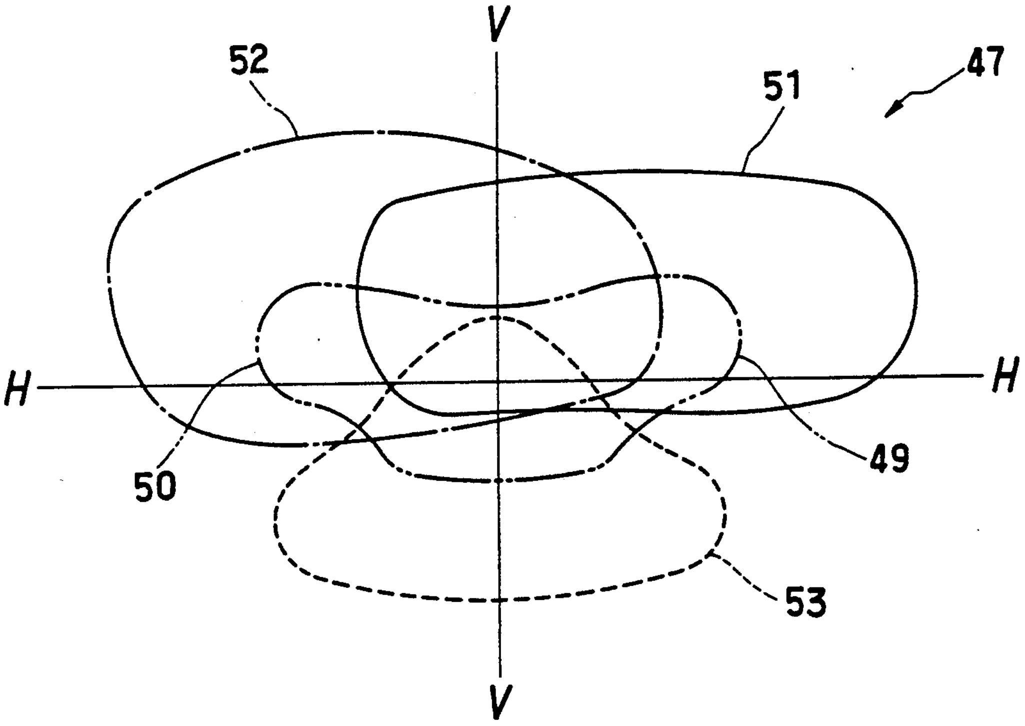
FIGS. 20A and 20B are drawings showing beam patterns provided by the reflector.
Figure 20B:
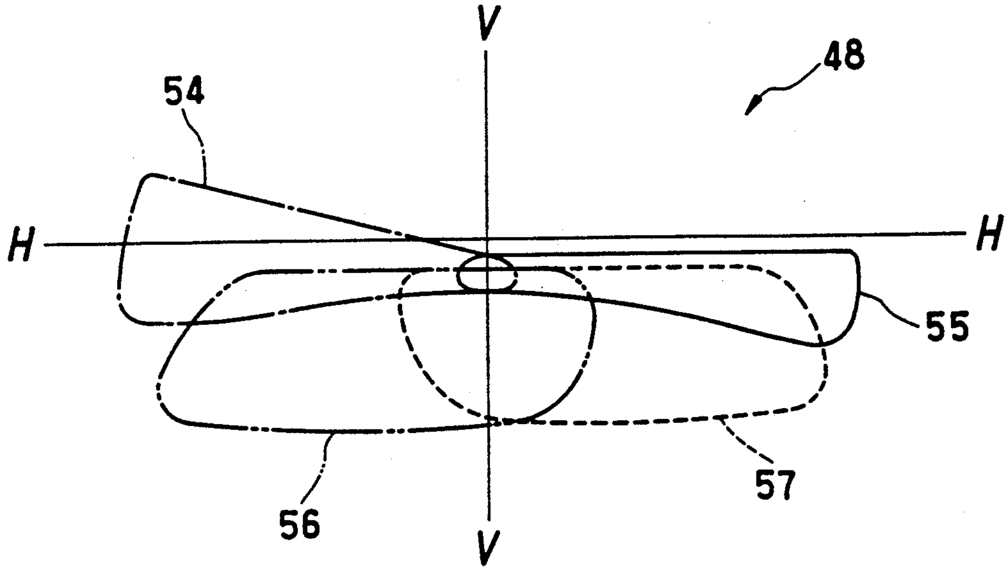

When a filament (not shown) for the high beam is energized, such a beam pattern 47 as shown in FIG. 20A is provided, while when a filament (not shown) for the low beam is energized, such a beam pattern 48 as shown in FIG. 20B is provided.

In the high beam pattern 47, the part denoted by numeral 49 is provided by a reflected light from the left light reflecting part 43, the part 50 is provided by a reflected light from the right light reflecting part 44, the part 51 is provided by a reflected light from the left-upper light reflecting part **46*l*, the part 52 is provided by a reflected light from the right-upper light reflecting part 46*r* and the part 53 is provided by a reflected light from the lower light reflecting part 45**.

In the low beam pattern 48, the part denoted by numeral 54 is provided by a reflected light from the left light reflecting part 43, the part 55 is provided by a reflected light from the right light reflecting part 44, the part 56 is provided by a reflected light from the left-upper light reflecting part **46*l* and the part 57 is provided by a reflected light from the right-upper light reflecting part 46*r***.

Figure 21:
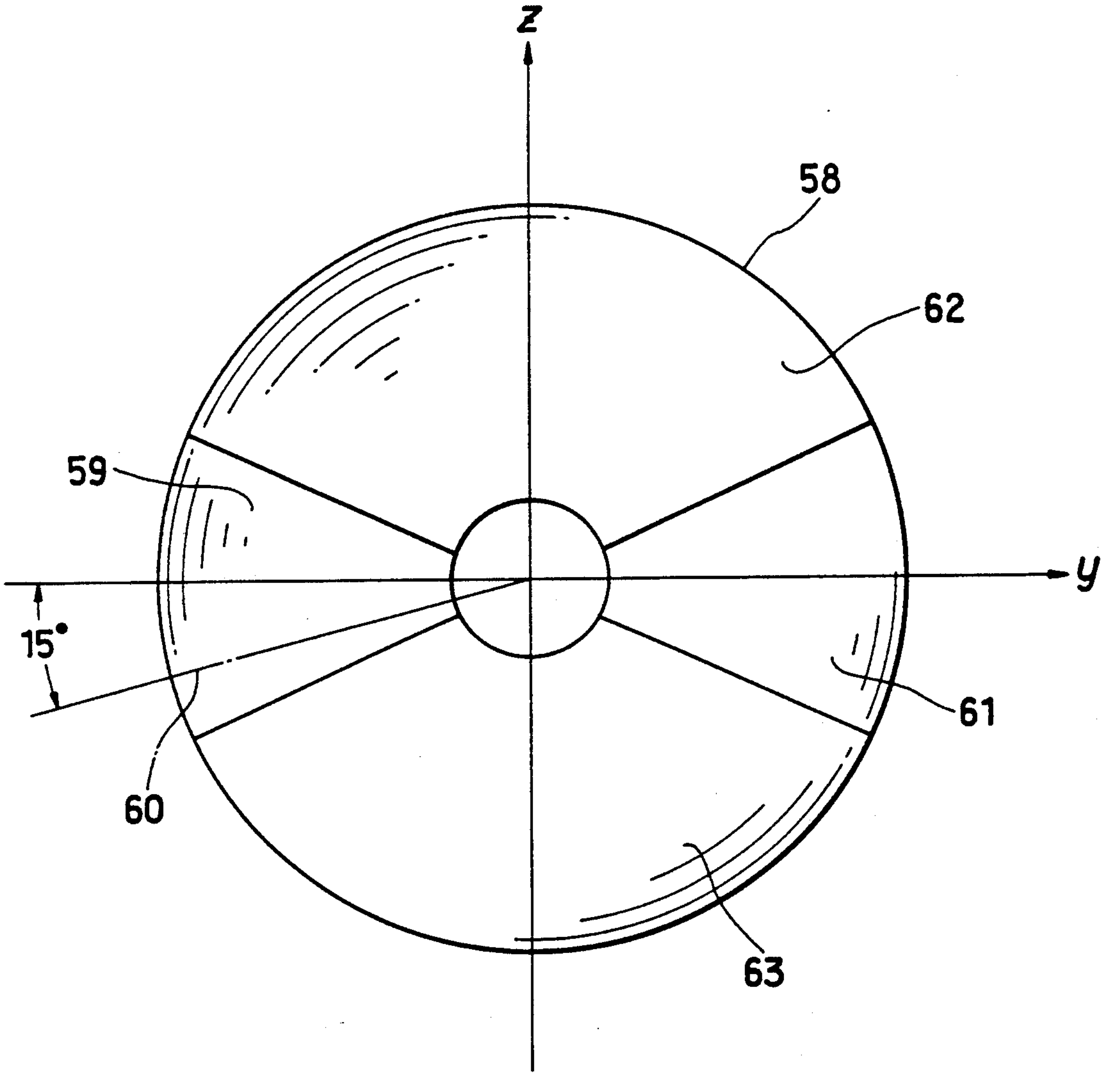

Referring to FIGS. 21 and 22, there is shown a modification 58 of the multi-surface concave reflector 42 of FIGS. 18 to 20.

In this modification, as is shown in FIG. 21, the lower half of the left light reflecting part 59 defined by an imaginary line 60 is displaced by an angle of 15° with respect to the y-axis. With this, a cut line, which corresponds to the left side edge of the shade member, possessed by a low beam pattern is much clearly shown in the beam pattern. It is to be noted that the right, upper and lower light reflecting surfaces 61, 62 and 63 are parabolic.

Figure 22A:
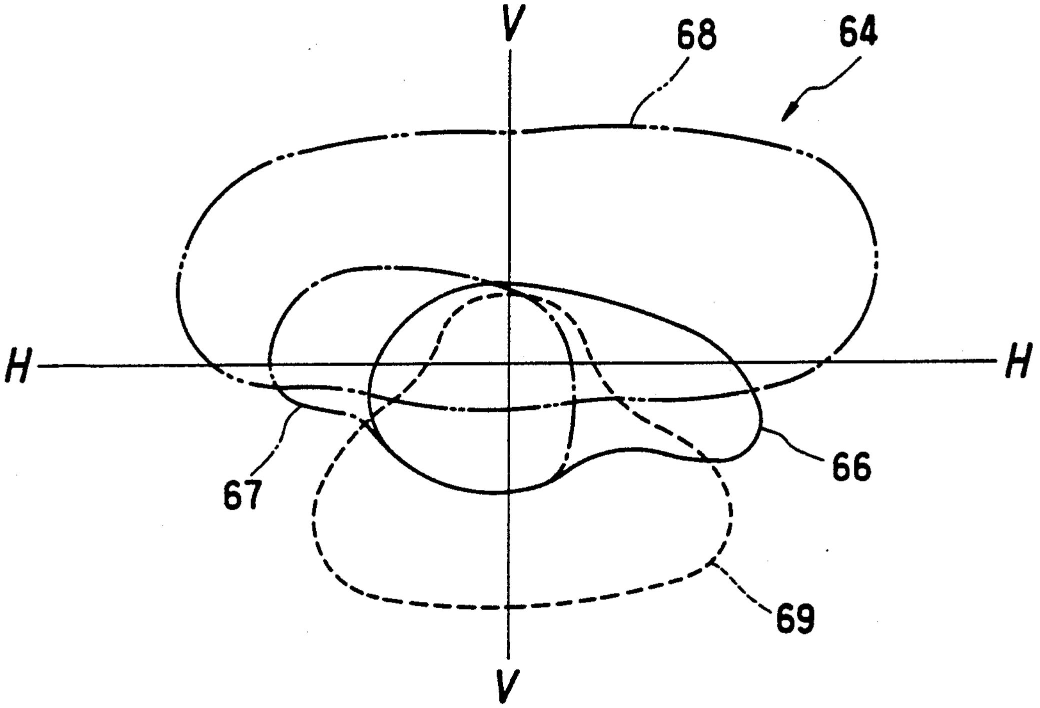
FIGS. 22A and 22B are drawings showing beam patterns provided by the modification.
Figure 22B:
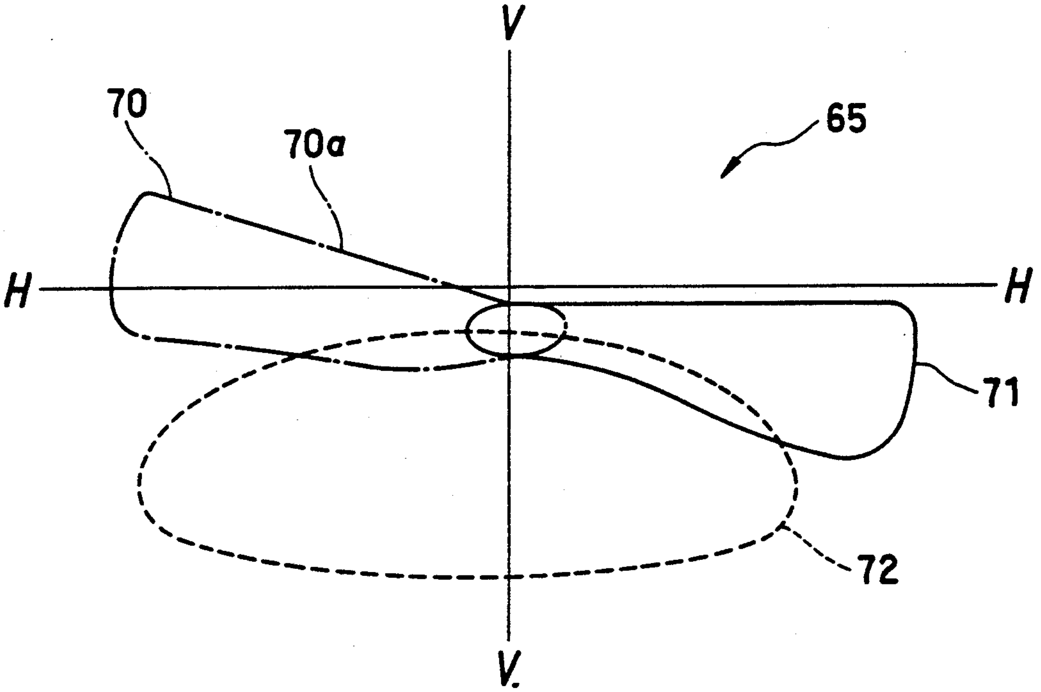

When a filament (not shown) for the high beam is energized, such a beam pattern 64 as shown in FIG. 22A is provided, and when a filament (not shown) for the low beam is energized, such a beam pattern 65 as shown in FIG. 22B is provided.

In the high beam pattern 64, the part denoted by numeral 66 is provided by a reflected light from the left light reflecting part 59, the part 67 is provided by a reflected light from the right light reflecting part 61, the part 68 is provided by a reflected light from the upper light reflecting part 62 and the part 69 is provided by a reflected light from the lower light reflecting part 63.

In the low beam pattern 65, the part denoted by numeral 70 is provided by a reflected light from the left light reflecting part 59, the part 71 is provided by a reflected light from the right light reflecting part 61, and the part 72 is provided by a reflected light from the upper light reflecting part 62. As is seen from FIG. 22B, an upper edge **70*a* of the part 70** is clearly viewed.

Figure 23:
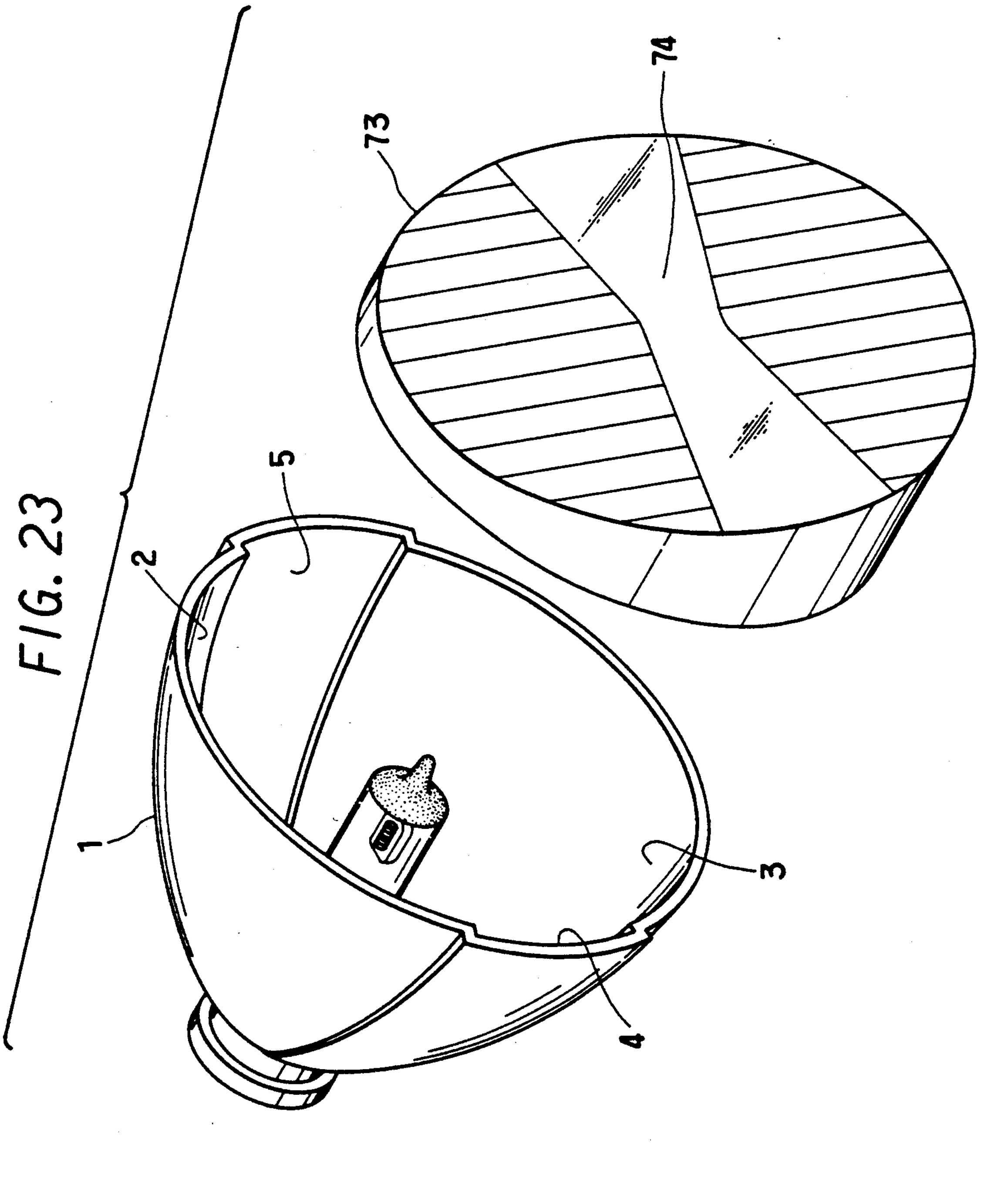
FIG. 23 is a perspective view of a headlamp unit showing one example of a lens.
Figure 24:
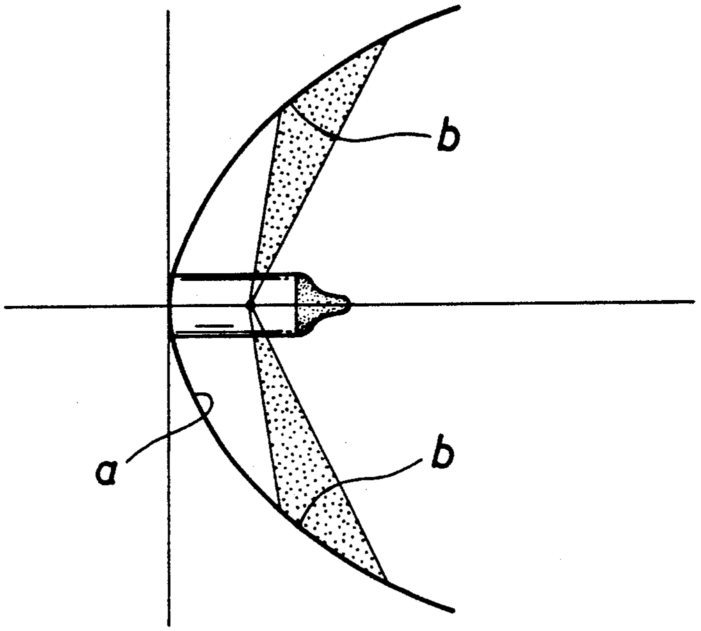
FIG. 24 PRIOR ART
FIGS. 24 and 25 are sectional views of a conventional headlamp unit, which has drawbacks possessed by a conventional reflector installed therein.
Figure 25:
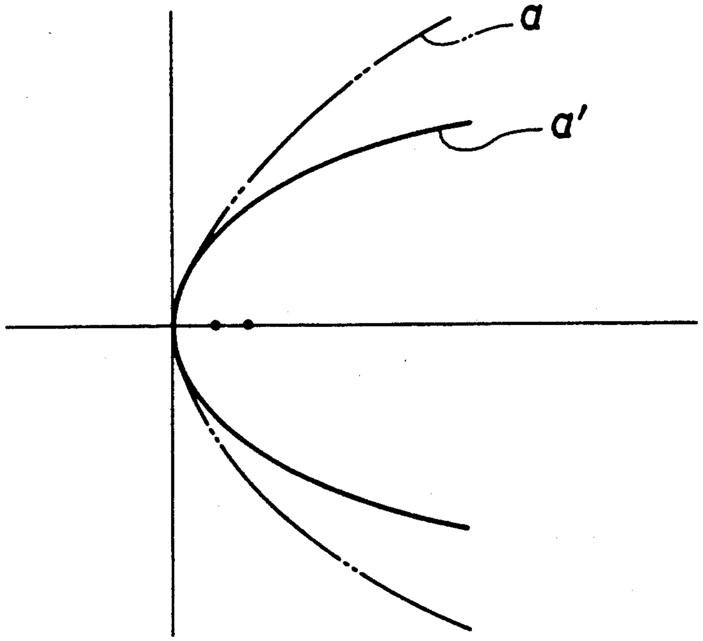
FIG. 25 PRIOR ART
Figure 26A:
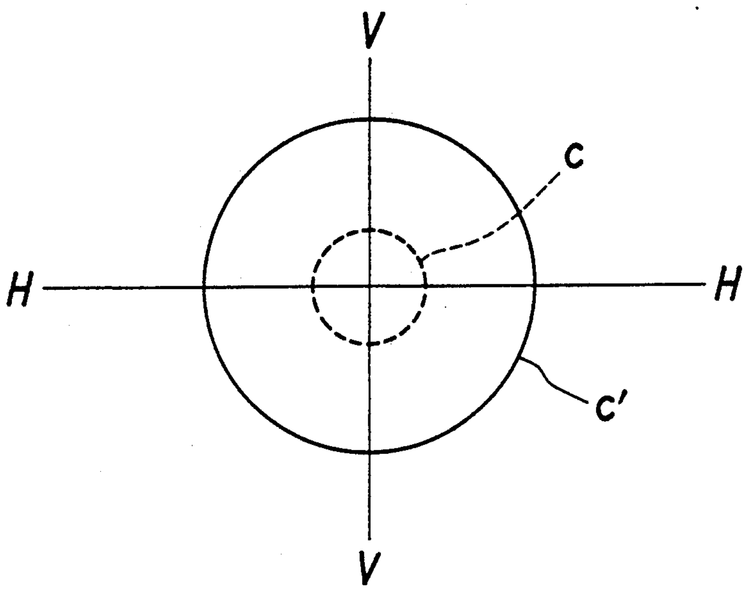
FIG. 26A PRIOR ART
FIGS. 26A and 26B are drawings showing beam patterns provided by the conventional headlamp unit.
Figure 26B:
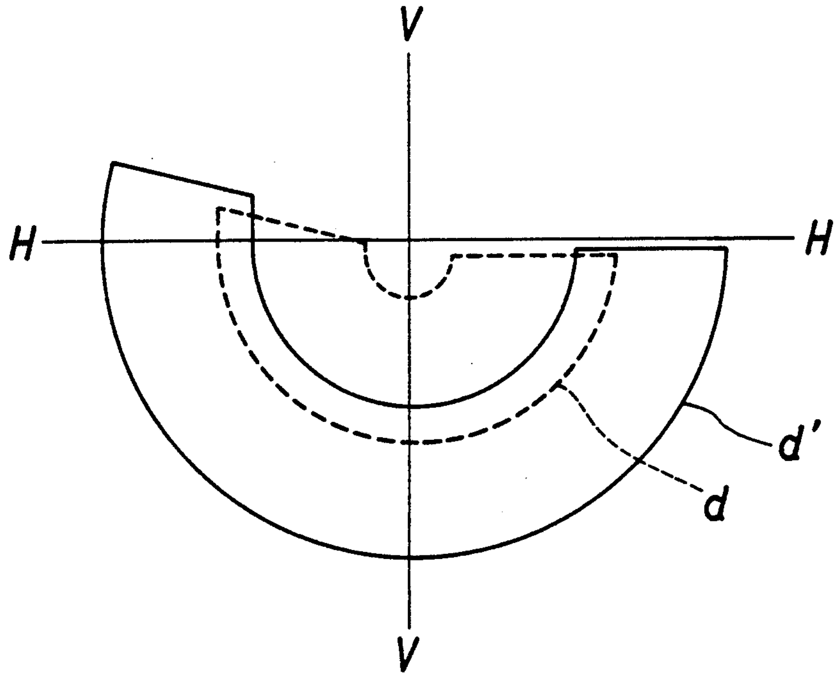
FIG. 26B PRIOR ART
Figure 27:
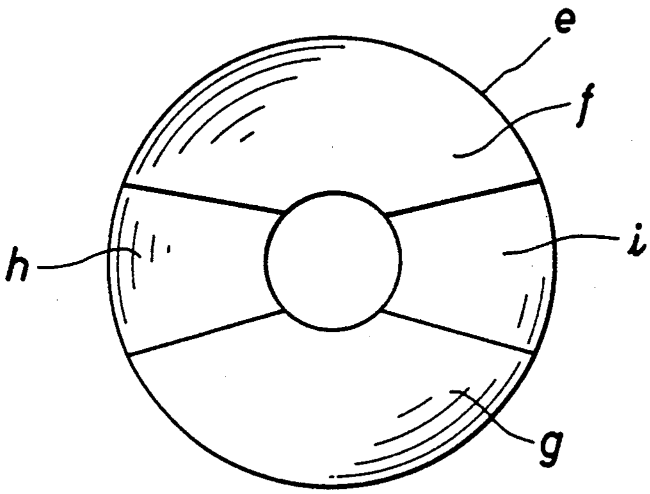
FIG. 27 PRIOR ART
Figure 28:
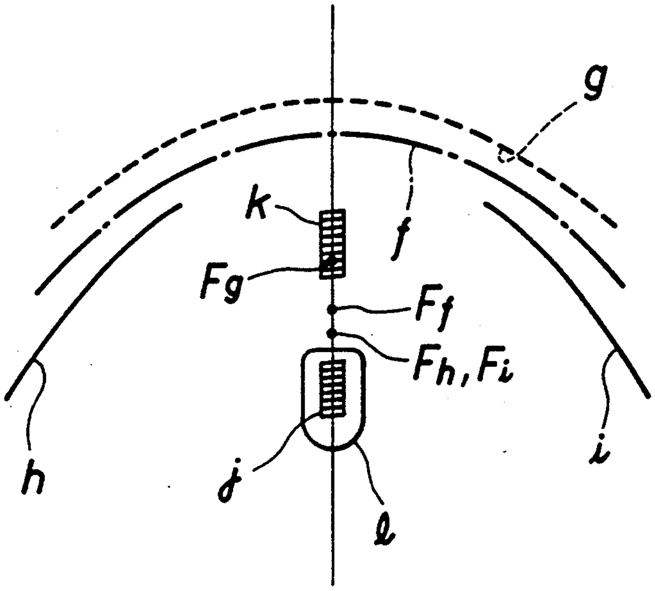
FIG. 28 PRIOR ART
Figure 29A:
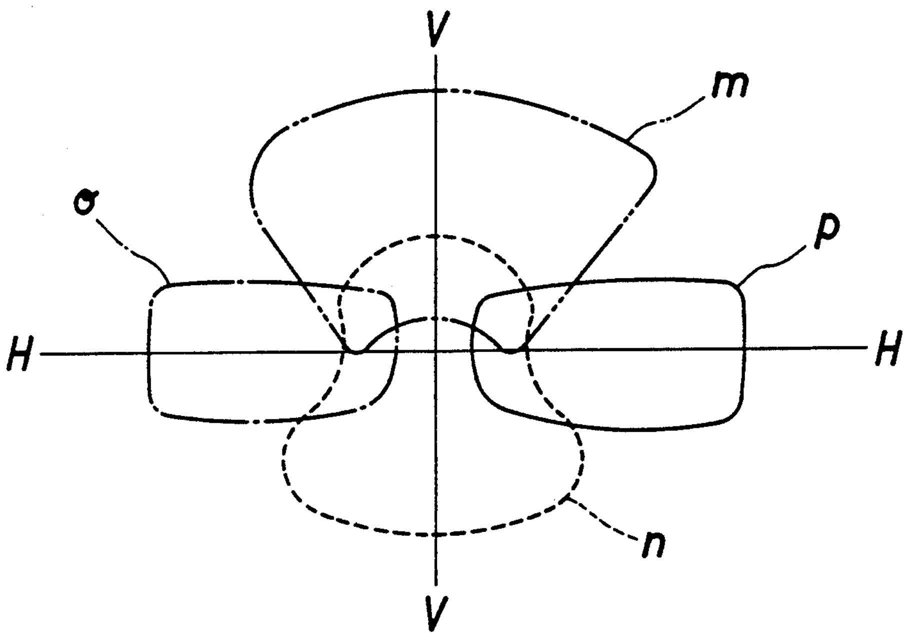
FIG. 29A PRIOR ART
FIGS. 29A and 29B are drawings showing beam patterns provided by the headlamp unit.
Figure 29B:
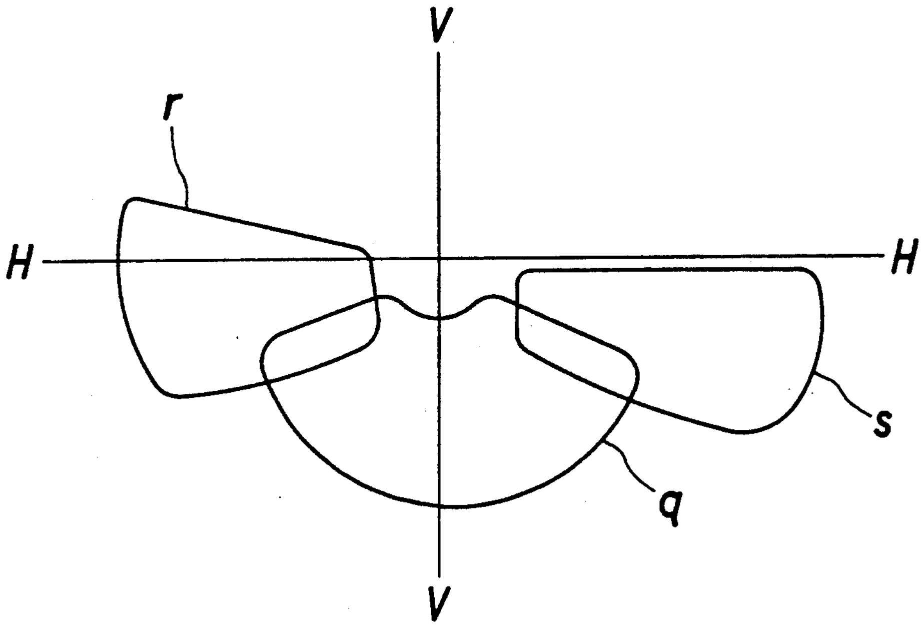
FIG. 29B PRIOR ART

Referring to FIG. 23, there is shown a lens 73 which is mounted on the mouth portion of the reflector 1. As shown, the lens 73 has, at portions corresponding to the left and right light reflecting parts of the reflector 1, a smoothed portion 74 which is free of lens steps. Thus, the illuminated part produced by the reflected light from the left light reflecting surface 59 can have a clear upper edge.

As is understood from the foregoing description, the headlamp unit which embodies the present invention projects high and low beam patterns each having a laterally elongated shape and a large highly illuminated zone in the pattern.

What is claimed is:

1. A headlamp unit comprising:

a multi-surface concave reflector having a beam axis along which a light beam projects forward to produce a beam pattern, the reflector including:

upper and lower cancave light reflecting parts which are respectively located at upper and lower positions with respect to a given portion of the reflector, and left and right concave light reflecting parts which are respectively located at left and right positions with respect to said given portion and have respective focuses on their respective optical axes, said optical axes being inclined with respect to the beam axis, each of the left and right concave light reflecting parts having respective curves of second degree when cut by vertical and horizontal planes; and first and second filaments of an electric bulb which are located on said beam axis, wherein the optical axes of said left and right concave light reflecting parts are inclined toward the left and right concave light reflecting parts with respect to said beam axis, respectively, and wherein the focuses of said left and right concave light reflecting parts are located at generally right and left positions with respect to said first filament, respectively.

2. A headlamp unit as claimed in claim 1, in which said first and second filaments extend along said beam axis.

3. A headlamp unit as claimed in claim 2, in which each of said left and right concave light reflecting parts is of a parabolic surface.

4. A headlamp unit as claimed in claim 2, in which each of said left and right concave light reflecting parts is of an elliptic surface.

5. A headlamp unit as claimed in claim 2, in which each of said left and right concave light reflecting parts is of a complex reflecting surface which consists of a parabolic surface and an elliptic surface.

6. A headlamp unit as claimed in claim 5, in which said complex reflecting surface describes a parabola when cut by a vertical plane and describes an ellipse when cut by a horizontal plane.

7. A headlamp unit as claimed in claim 5, in which said complex reflecting surface describes an ellipse when cut by a vertical plane and describes a parabola when cut by a horizontal plane.

8. A headlamp unit as claimed in claim 2, in which said lower light reflecting part is of a paraboloid of revolution, and in which said upper light reflecting part is divided into two portions.

9. A headlamp unit as claimed in claim 8, in which each of said two portions of said upper light reflecting part describes a parabola when cut by a vertical plane and describes an ellipse when cut by a horizontal plane.

10. A headlamp unit as claimed in claim 9, in which one of said two portions is dislocated by a given angle with respect to a horizontal axis which passes through a center of said reflector.

11. A headlamp unit as claimed in claim 2, further comprising a lens which is mounted on a mouth portion of said multi-surface concave reflector.

12. A headlamp unit as claimed in claim 11, in which said lens has, at portions corresponding to the left and right light reflecting parts, a smoothed portion which is free of lens steps.

13. A headlamp unit as claimed in claim 2, in which said reflector has at its center a circular opening.

* * * * *